(12) United States Patent
Gray

(10) Patent No.: US 6,970,159 B2
(45) Date of Patent: Nov. 29, 2005

(54) MOUSE PRINTING DEVICE WITH INTEGRATED TOUCH PAD BUTTONS

(76) Inventor: Robin S. Gray, 3538 Split Rail La., Ellicott City, MD (US) 21042

( * ) Notice: Subject to any disclaimer, the term of this patent is extended or adjusted under 35 U.S.C. 154(b) by 512 days.

(21) Appl. No.: 09/888,819

(22) Filed: Jun. 25, 2001

(65) Prior Publication Data

US 2002/0196234 A1    Dec. 26, 2002

(51) Int. Cl.$^7$ ............................................. G09G 5/00
(52) U.S. Cl. ...................... 345/173; 345/163
(58) Field of Search .............................. 345/163, 173, 345/156

(56) References Cited

U.S. PATENT DOCUMENTS

| | | | |
|---|---|---|---|
| 4,680,577 A | | 7/1987 | Straayer et al. |
| 4,905,523 A | | 3/1990 | Okada |
| 5,268,674 A | * | 12/1993 | Howard et al. ............. 345/163 |
| 5,327,161 A | * | 7/1994 | Logan et al. ............... 345/157 |
| 5,407,285 A | | 4/1995 | Franz |
| 5,473,347 A | * | 12/1995 | Collas et al. ............... 345/169 |
| 5,489,900 A | | 2/1996 | Cali et al. |
| 5,504,502 A | | 4/1996 | Arita et al. |
| 5,521,596 A | | 5/1996 | Selker et al. |
| 5,530,455 A | * | 6/1996 | Gillick et al. ............... 345/163 |
| 5,659,334 A | | 8/1997 | Yaniger et al. |
| 5,694,123 A | | 12/1997 | Selker et al. |
| 5,741,217 A | * | 4/1998 | Gero ........................... 600/547 |
| 5,805,144 A | * | 9/1998 | Scholder et al. ............. 345/163 |
| 5,889,507 A | | 3/1999 | Engle et al. |
| 5,936,555 A | * | 8/1999 | Zagnoev ....................... 341/22 |
| 5,973,622 A | * | 10/1999 | Chiang ......................... 341/22 |
| 5,986,645 A | | 11/1999 | Brooks |
| 6,030,291 A | | 2/2000 | Maki et al. |
| 6,107,990 A | | 8/2000 | Fleming, III |
| 6,239,786 B1 | | 5/2001 | Burry et al. |
| 6,359,611 B2 | * | 3/2002 | Chan ........................... 345/156 |
| 6,424,338 B1 | * | 7/2002 | Anderson .................... 345/173 |
| 6,489,948 B1 | * | 12/2002 | Lau ............................... 345/163 |
| 6,507,338 B1 | * | 1/2003 | Liao et al. ................... 345/173 |

* cited by examiner

*Primary Examiner*—Sumati Lefkowitz
*Assistant Examiner*—Ming-Hun Liu
(74) *Attorney, Agent, or Firm*—Robin S. Gray

(57) ABSTRACT

A computer mouse system and method of using is presented whereby the computer mouse system is used in conjunction with laptop or notebook computers or with external or auxiliary mouse, and with external or auxiliary computer keyboards. Each embodiment having touch pads, glide points, touch screens, or touch panels, integrated into the touch pads, glide points, touch panels, or touch screens by building, molding, manufacturing. The touch pads, glide points, touch screens, or touch panels, can also be placed at alternative locations on any of the mouse systems.

24 Claims, 14 Drawing Sheets

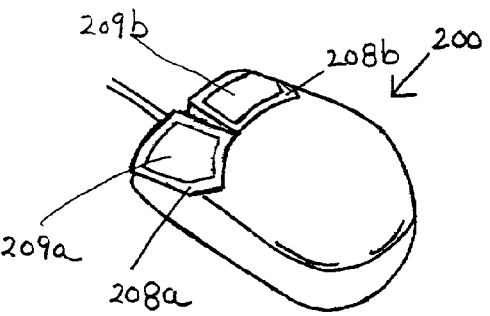
FIG. 11
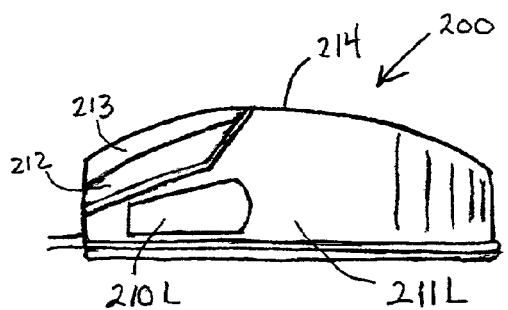
FIG. 12
FIG. 13
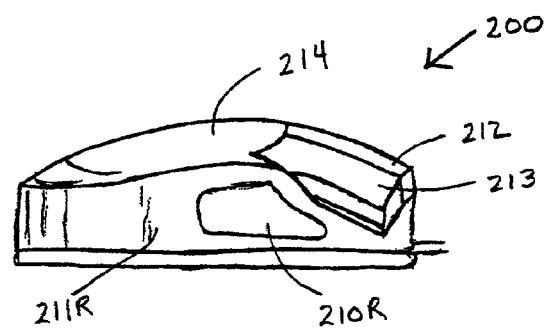

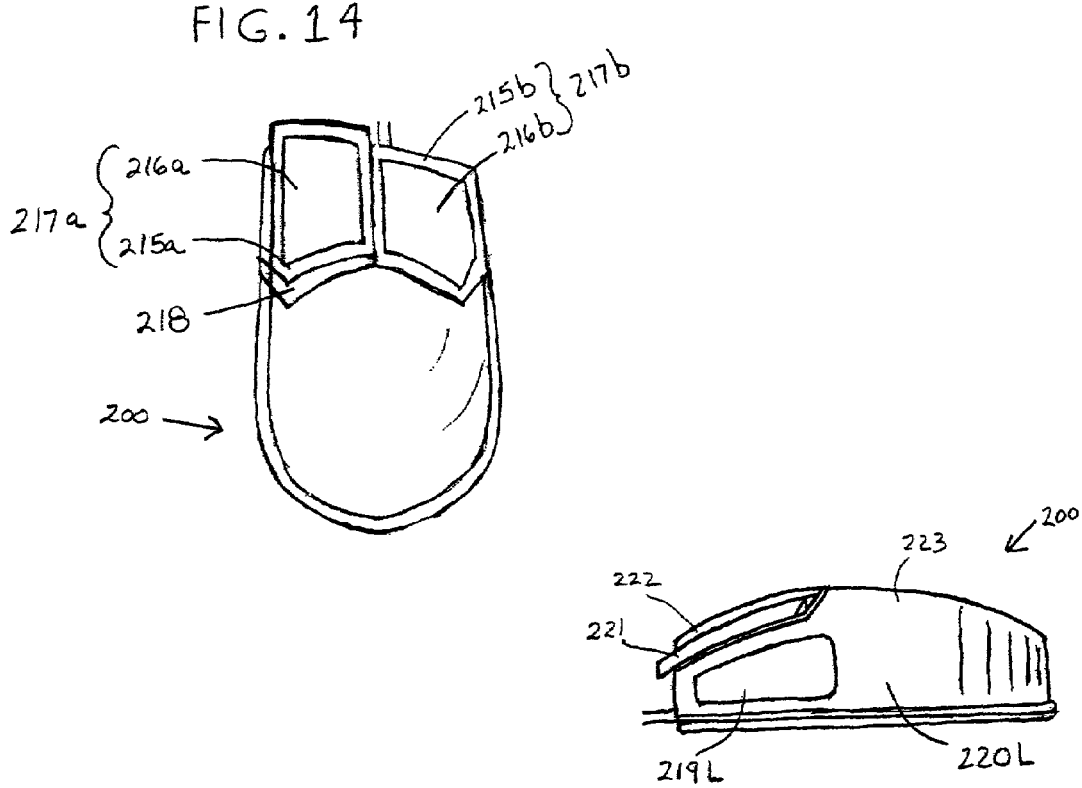
FIG. 14
FIG. 15
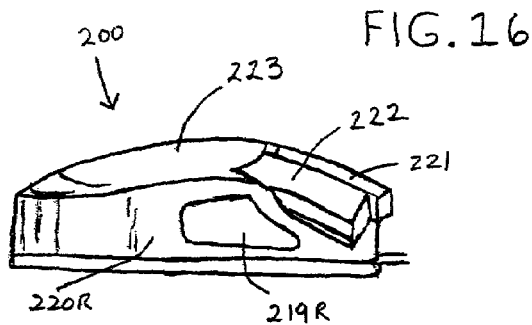
FIG. 16

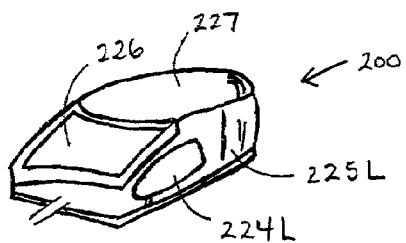
FIG. 17
FIG. 18
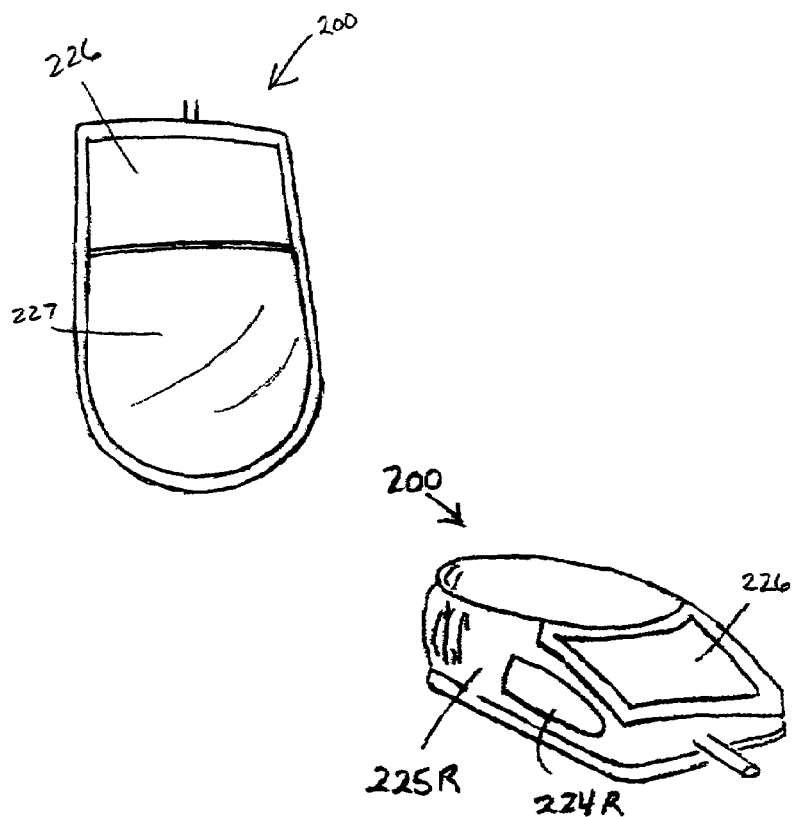
FIG. 19

MOUSE PRINTING DEVICE WITH INTEGRATED TOUCH PAD BUTTONS

BACKGROUND OF THE INVENTION

A computer mouse is a device used in conjunction with a computer to manipulate application software and/or a computer operating system to reduce keystrokes and, in general, make computers more user-friendly. A mouse device can be used to move a cursor around a computer text display and/or graphics display. Different types of mouse devices have been integrated into laptop or notebook computers, such as: pointing sticks, glide points, and track balls, to provide the user the convenience of travel without the necessity of multiple attachments. Current mouse designs on laptop computers provide left and right buttons and a separate touch pad, pointing stick, or trackball. Pointing sticks are typically joy sticks which are located in the keys of the keyboard and used to move the cursor. Separate press and hold buttons are provided. A trackball is a ball located in the mouse device which is rotated to move the cursor. The trackball also has separate press and hold buttons. Glide points, touch pads, touch panels, or touch screens are touch sensitive pointing devices used for positioning the cursor. There are separately located touch and hold mouse buttons. One drawback of these mouse designs is that the use of two hands is generally required for manipulating the left and right buttons when used in conjunction with the pointing device to perform operations, such as highlighting a selected portion of a document for printing. In this case, the left mouse button, for example, is depressed and held down with one finger of one hand of the user while another finger on the other hand of the user is used to manipulate the pointing device to direct the cursor to highlight the desired section for printing. Some users of this mouse design are able to use and manipulate the mouse using one finger on a mouse button and a second finger from the same hand on the pointing device to manipulate the cursor or screen selector to highlight the desired text. However, the buttons cannot be manipulated easily by using one hand due to the hand and finger positioning and coordination required of the user. Because of this, problems and errors have and continue to occur whether the user manipulates the mouse with one or two hands. For example, users of the prior art mouse devices, which require the user to hold down the mouse button while using the pointing device to manipulate the cursor or screen selector, may inadvertently release the mouse button being held down which terminates the operation. This can result in files being misplaced or stored in an erroneous location, inserted into other files, or completely deleted. Using such prior art mouse devices is inconvenient and cumbersome. The present invention overcomes the drawbacks noted above.

SUMMARY OF THE INVENTION

This invention relates to a new and improved mouse system used for portable computers such as: laptop computers, notebook computers, palmtop computers, handspring computers, visor computers, pocket pc's, and personal organizers. Additionally, a new and improved mouse system is presented for an external or auxiliary mouse system which is used in conjunction with computers such as: laptop computers, notebook computers, palmtop computers, personal organizers, handspring computers, visor computers, pocket pc's, personal computers, home computers, office computers, desktop computers, and any other type of computer which is capable of using an external or auxiliary mouse system. Also, a new and improved mouse system is presented for external or auxiliary computer keyboards used in conjunction with personal computers, home computers, handspring computers, visor computers, pocket pc's, office computers, desktop computers, and any other type of computer device which is capable of using an external or auxiliary computer keyboard. The different mouse systems of the invention make operation of these computers easier and more convenient to use. Additionally, the design and method of the new and improved mouse system affords individuals with a disability, such as use of only one arm or hand, the ability to manipulate the new and improved mouse system without the inconvenience of holding down buttons while manipulating pointing devices such as touch pads.

In a first embodiment of this invention, it is an object to provide a new and improved mouse system for laptop computers, notebook computers, palmtop computers, handspring computers, visor computers, pocket pc's, and personal organizers which uses at least one press button and a touch pad, touch panel, glide point, or touch screen built, molded, or manufactured into the at least one press button of the improved mouse system. For example, the mouse system can have the touch screen, touch panel, glide point, or touch pad built into a left press button and/or a right press button forming a left and/or right press touch button. However, the invention is not limited to use of only one or two press buttons. The mouse system may also have the touch pad, touch panel, glide point, or touch screen integrated, built, molded, or manufactured into an area of the computer separate from the at least one press button. In this invention, the method of using or manipulating the mouse system does not require the user to hold the press buttons down while manipulating the touch screens, touch pads, touch panels, or glide points. That is, the touch pad, touch panel, glide point, or touch screen can be positioned in between at least two press buttons, on the right side of the at least one press button, adjacent and on the front side of the at least one press button, or adjacent and behind the at least one press button.

As a modification to the first embodiment, it is a further object of the invention to provide at least one press and lock button, which upon pressing from the original position, remains in a depressed or locked position. This does not require the user to hold the button down while manipulating the touch screen, touch pad, glide point, or touch panel. The depressed press and lock button is returned to its original position when pressed again. This alternative may also have the touch pad, touch panel, glide point, or touch screen, integrated, built, molded, or manufactured into the at least one press and lock button, forming a press and lock touch button, or into an area of the computer separate from the at least one press and lock button. That is, the touch pad, touch panel, glide point, or touch screen can be positioned in between at least two press and lock buttons, on the right side of at least one press and lock button, adjacent and on the front side of at least one press and lock button, or adjacent and behind at least one press and lock button.

As an additional modification to the first embodiment, it is a further object of the invention to use at least one sliding panel button. The at least one sliding panel button can have the touch pad, glide point, touch panel, or touch screens built molded, or manufactured into the at least one sliding panel button forming at least one sliding panel touch button. The mouse system may also have the touch pad, touch panel, glide point, or touch screen, integrated, built, molded, or manufactured into an area of the computer separate from the at least one sliding panel button. That is, the touch pad, touch panel, glide point, or touch screen can be positioned in between at least two sliding panel buttons, on the right side of at least one sliding panel button, adjacent and on the front side of at least one sliding panel button, or adjacent and behind at least one sliding panel button.

Additionally, each of the methods of using the mouse systems of the instant invention does not require the user to hold down the mouse button with a finger or other object while manipulating the touch pad, touch screen, glide point, or touch panel.

In a second embodiment of the instant invention, it is an object of the invention to provide a new and improved external or auxiliary mouse system used for personal computers, laptop or notebook computers, palmtop computers, personal organizers, handspring computers, visor computers, pocket pc's, home computers, office computers, desktop computers, and any other type of computer which is capable of using or functioning with an external or auxiliary mouse system. The external or auxiliary mouse system of the instant invention has a housing with an upper surface shaped or formed to fit the palm or inside of the hand. Alternative designs are also permitted. The auxiliary mouse system is a hand-manipulated mouse system external to the keyboard, monitor, and central processing unit and connects to the central processing unit by way of at least one port. The external or auxiliary mouse system of the instant invention has at least one press button having a built-in touch pad, touch panel, glide point, or touch screen, forming a press touch button. The external or auxiliary mouse system can have a left press button and a right press button, for example. However, the invention is not limited to use of only one or two press buttons. The external or auxiliary mouse system can have a touch screen, touch panel, glide point, or touch pad built, manufactured, or molded into the left press button and/or the right press button, forming left and/or right press touch buttons. The external or auxiliary mouse system may also have the touch pad, glide point, touch panel, or touch screen built, molded, or manufactured into an area of the external or auxiliary mouse system separate from the at least one press button. That is, the touch pad, glide point, touch panel, or touch screen can be positioned in between at least two press buttons, on the left side of at least one press button, on the right side of at least one press button, on the front side of at least one press button, or behind at least one press button.

As a modification of the second embodiment, it is a further object to provide at least one press and lock button, which upon pressing from an original position, remains in the depressed or locked position. The depressed or locked press and lock button is returned to its original position when the depressed or locked press and lock button is pressed again. This modification may also have the touch pad, glide point, touch screen, or touch panel, integrated, built, molded, or manufactured into the at least one press and lock button forming a press and lock touch button, or integrated, built, molded, or manufactured into an area of the external or auxiliary mouse system that is separate from the at least one press and lock button. That is, the touch pad, glide point, touch panel, or touch screen can be positioned in between at least two press and lock buttons, on the left side of at least one press and lock button, on the right side of at least one press and lock button, on the front side of at least one press and lock button, or behind at least one press and lock button.

As an additional modification to the second embodiment, it is a further object of the invention to use at least one sliding panel button. The at least one sliding panel button can have the touch pad, glide point, touch panel, or touch screen integrated, built, manufactured, or molded into the at least one sliding panel button forming a sliding panel touch button. The external or auxiliary mouse system may also have the touch pad, glide point, touch panel, or touch screen built, molded, or manufactured into an area of the external or auxiliary mouse system that is separate from the at least one sliding panel button. That is, the touch pad, touch panel, glide point, or touch screen can be positioned in between at least two sliding panel buttons, on the left side of at least one sliding panel button, on the right side of at least one sliding panel button, on the front side of at least one sliding panel button, or behind at least one sliding panel button.

As a further modification to the second embodiment of this invention, it is an object to provide a new and improved external or auxiliary mouse system having at least one press button, at least one press and lock button, or at least one sliding panel button positioned on top or upper surface of the external or auxiliary mouse system wherein the touch pad, glide point, touch panel, or touch screen is positioned on a side-wall of the external or auxiliary mouse system such that the touch screen, touch panel, glide point, or touch pad can be manipulated with the thumb. It is an object of this invention to provide left-handed and right-handed external or auxiliary mouse systems which can be used with personal computers, laptop or notebook computers, palmtop computers, personal organizers, handspring computers, visor computers, pocket pc's, home computers, office computers, desktop computers, and any other type of computer which is capable of using or functioning with an external or auxiliary mouse system. It is noted that an external or auxiliary mouse system of the instant invention may have reversed "left" and "right" buttons relative to the right-handed external or auxiliary mouse system such that the "left" button for a right-handed external or auxiliary mouse system becomes the "right" button for a left-handed external or auxiliary mouse system and the "right" button for a right-handed external or auxiliary mouse system becomes the "left" button for a left-handed external or auxiliary mouse system. Additionally, the method of using or manipulating the different alternatives discussed for the external or auxiliary mouse system does not require the user to hold down the buttons while manipulating the touch screen, touch pad, glide point, or touch panel.

In a third embodiment of the instant invention, it is an object of the invention to provide a new and improved external computer keyboard by providing the external computer keyboard with a mouse system having at least one mouse press button. In this invention, the method of using or manipulating the external computer keyboard mouse system does not require the user to hold down the mouse button while manipulating a touch screen, touch panel, glide point, or touch pad. The external computer keyboard mouse system has at least one press button with a touch pad, glide point, touch panel, or touch screen integrated, built, molded, or manufactured into the at least one press button, forming a press touch button. The mouse system of the external computer keyboard can have a touch screen, touch panel, glide point, or touch pad integrated, built, molded, or manufactured into a left press button and/or a right press button forming left and/or right touch buttons. However, the invention is not limited to use of only one or two press buttons. The external computer keyboard mouse system may also have a touch pad, glide point, touch panel, or touch screen built, molded, or manufactured into an area of the external computer keyboard that is separate from the at least one press button. That is, the touch pad, glide point, touch panel, or touch screen can be positioned in between at least two press buttons, on the left side of at least one press button, on the right side of at least one press button, on the front side of at least one press button, or behind at least one press button.

As a modification to the third embodiment, it is a further object to provide at least one press and lock button, which upon pressing from an original position to a depressed or locked position, remains in the depressed or locked position while the user manipulates the touch pad, glide point, touch screen, or touch panel which is integrated, built, molded or manufactured into the at least one press and lock button, forming a press and lock touch button, or is built, molded, or manufactured into an area of the external computer keyboard that is separate from the at least one press and lock button. The touch pad, touch screen, touch panel, or glide point may also be positioned on a sidewall of the external computer keyboard. The mouse buttons may also be integrated, built, molded, or manufactured into a sidewall of the external computer keyboard. In this invention, the method of using or manipulating the external computer keyboard mouse system does not require the user to hold down the at least one press and lock button while manipulating the touch screen, touch panel, glide point, or touch pad. The depressed press and lock button is pressed again to return the depressed or locked press and lock button to its original position.

As an additional modification to the third embodiment, it is a further object to use at least one sliding panel button. The at least one sliding panel button can have the touch pad, glide point, touch panel, or touch screen built, integrated, molded, or manufactured into the at least one sliding panel button forming at least one sliding panel touch button. The mouse system of the external computer keyboard may also have the touch pad, touch panel, glide point, or touch screen built, molded, or manufactured into an area of the external keyboard that is separate from the at least one sliding panel button. That is, the touch pad, glide point, touch panel, or touch screen can be positioned in between at least two sliding panel buttons, on the left side of at least one sliding panel button, on the right side of at least one sliding panel button, on the front side of at least one sliding panel button, or behind at least one sliding panel button. The touch pad, glide point, touch panel, or touch screen may also be positioned on a sidewall of the external computer keyboard mouse system such that the touch screen, touch panel, glide point, or touch pad is manipulated with the thumb, other finger, or object.

These and other objects and advantages of the instant invention will be apparent from the more detailed description which follows.

BRIEF DESCRIPTION OF THE DRAWINGS

Throughout the drawing figures, like reference numerals refer to like parts. The design features of the embodiments represented in the drawings are not intended to be restrictive to the inventive concept and other variations or modifications to the design features shown may be applied.

FIG. 11 is a left perspective view of an external or auxiliary mouse system of the instant invention having left and right press and lock touch buttons. The left and right press and lock buttons each have a touch panel, touch screen, touch pad, or glide point built, molded, or manufactured therein.

FIG. 12 is a left side view of an external or auxiliary mouse system of the instant invention having a left press and lock button and a right press and lock button and a touch pad, touch screen, touch panel, or glide point built, molded, or manufactured into the left sidewall of the external or auxiliary mouse system.

FIG. 13 is a right side view of an external or auxiliary mouse system of the instant invention having a left press and lock button and a right press and lock button with a touch panel, touch pad, touch screen, or guide point built, molded, or manufactured into the right sidewall of the external or auxiliary mouse system.

FIG. 14 is a top view of an external or auxiliary mouse system of the instant invention having left and right sliding panel touch buttons. The sliding panel buttons each have a touch panel, touch screen, touch pad, or glide point built, molded, or manufactured therein.

FIG. 15 is a left side view of an external or auxiliary mouse system of the instant invention showing a left sliding panel button displaced forwardly. There is also shown a left touch panel, touch screen, touch pad, or glide point, built, molded, or manufactured into the left sidewall.

FIG. 16 is a right side view of an external or auxiliary mouse system of the instant invention showing a left sliding panel button displaced forwardly. There is also shown a right touch panel, touch screen, touch pad, or glide point built, molded, or manufactured into the right sidewall.

FIG. 17 is a left front-side perspective of an external or auxiliary mouse system wherein the touch pad, touch screen, touch panel, or glide point is built, molded, or manufactured into the upper surface of the external or auxiliary mouse system. This auxiliary mouse system has press buttons, press and lock buttons, or sliding panel buttons built, molded, or manufactured into the left sidewall.

FIG. 18 is a top view of FIG. 17 showing the touch pad, touch screen, touch panel, or glide point built, molded, or manufactured into the top surface.

FIG. 19 is a right front-side perspective of the external or auxiliary mouse system of FIG. 17 showing a right press button, press and lock button, or sliding panel button built, molded, or manufactured into the right sidewall.

DETAILED DESCRIPTION OF THE INVENTION

The following descriptions are presented to enable any person skilled in the art to make and use the invention, and are provided in the context of a particular application and its requirements. Various modifications to the disclosed embodiments will be readily apparent to those skilled in the art, and the general principles defined herein may be applied to other embodiments and applications without departing from the spirit and scope of the invention. The present invention is not intended to be limited to the embodiments described, but to be accorded with the widest scope consistent with the principles and features disclosed herein.

Portable Laptop or Notebook Computer Mouse System

For the purpose of describing the use of the instant invention, portable computers, such as: laptop computers, notebook computers, palmtop computers, personal organizers, handspring computers, visor computers, and pocket pc's, and any other type of computer which can be categorized as portable, will all be hereafter described in accordance with the invention by making reference only to laptop or notebook computers. It is noted, however, that palmtop computers, personal organizers, handspring computers, visor computers, and pocket pc's, and any other type of portable computers are compatible with and may be used with the computer mouse system of the instant invention.

Figure 1:
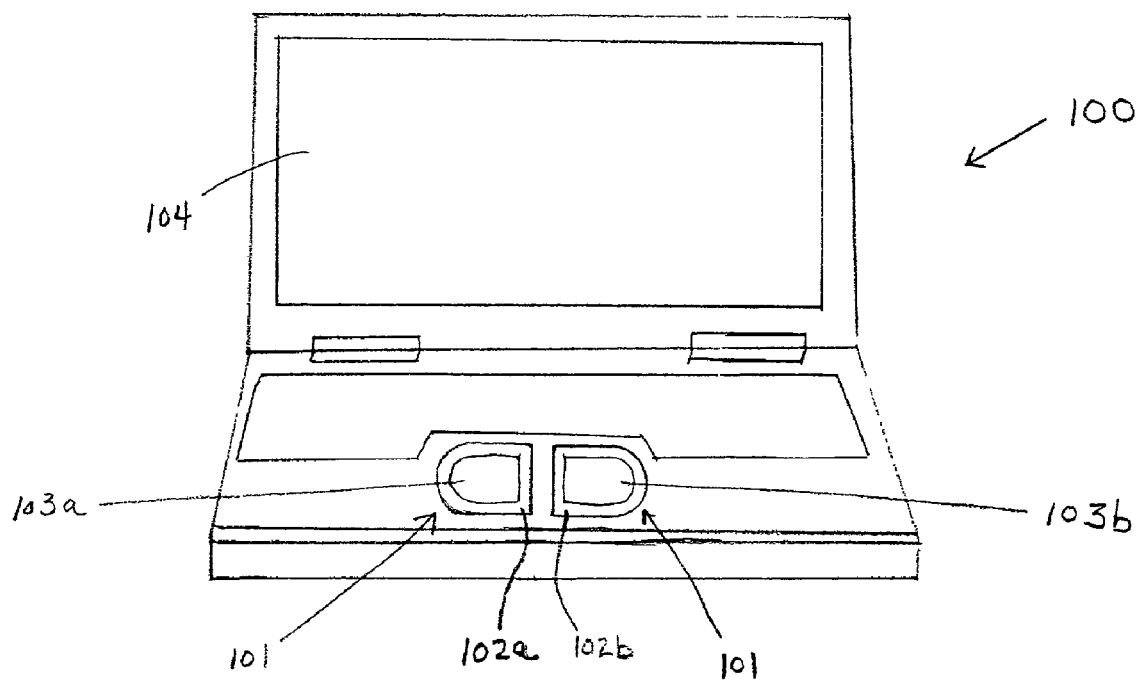
FIG. 1 is a front perspective view of a laptop or notebook computer having a press button mouse system of the instant invention with the mouse system having the touch screen, touch panel, glide point, or touch pad built, molded, or manufactured into the left button and the right button.

A new and improved laptop or notebook computer mouse system of the instant invention, as shown by FIG. 1, provides a mouse system 101 for a laptop or notebook computer 100 by providing at least one press button 102 with a touch screen, touch panel, glide point, or touch pad 103 built, molded, or manufactured into the at least one press button 102. The at least one press button 102 may be a left press button 102a and/or a right press button 102b, as shown in FIG. 1. Advantages to providing the touch screen, touch panel, glide point, or touch pad 103 being integrated, built, molded, or manufactured into and on the at least one press button 102, are that space is made available for other purposes on the laptop or notebook keyboard and that only one hand is needed by the user to manipulate the laptop or notebook computer mouse system 100. As an example, a user of the new and improved laptop or notebook computer mouse system design 101 desiring to cut, copy, paste, move, delete, change the style or font of, print, change the spacing of, or perform any other operation on, a section of text displayed on the computer monitor 104, or any other type of monitor associated with the laptop or notebook computer mouse system 101, would first locate the arrow or screen selector to the desired position in the text using the left touch pad, glide point, touch screen, or touch panel 103a located on the left press button 102a and/or the right touch pad, touch screen, touch panel, or glide point 103b on the right press button 102b by lightly touching and moving a finger or other object over the surface of the left touch screen, touch panel, glide point, or touch pad 103a located on the left press button 102a and/or the right touch pad, touch screen, touch panel, or glide point 103b located on the right press button 102b. When the screen selector or arrow is in the desired position in the text, the user then taps the touch screen, glide point, touch pad, or touch panel 103a and/or 103b to position the cursor at the starting point of the text to be highlighted. Next, the user depresses and releases the left press button 102a or the right press button 102b, at least once, such that the left press button 102a or the right press button 102b returns to its original position after the pressure applied to press the press button is removed, which prompts the computer software and/or computer operating system that highlighting will be the next mode of operation. Note that the user is not required to hold the button after pressing and while manipulating the touch screen, glide point, touch pad, or touch panel. It is noted that the invention is not limited to use of only one or two press buttons. The user then uses the left touch screen, touch panel, glide point, or touch pad 103a on the left press button 102a and/or the right touch panel, touch pad, touch screen, or glide point 103b located on the right press button 102b to highlight the desired text by touching and moving a finger or other object over the surface of the touch screen, touch panel, glide point, or touch pad 103a located on the left press button 102a and/or the right touch pad, touch screen, touch panel, or glide point 103b located on the right press button 102b. After the desired text has been highlighted, the user again depresses and releases the left press button 102a or the right press button 102b, such that the left press button 102a or the right press button 102b returns to the original position after the pressure applied to press the press button is removed. This releases the computer software and/or computer operating system from the highlighting mode. The user then uses the left touch screen, touch panel, glide point, or touch pad 103a of the left press button 102a or the right touch pad, touch screen, glide point, or touch panel 103b of the right press button 102b to manipulate the arrow or screen selector to point to an icon or open a window, for example, to select the desired operation to be performed on the highlighted text; such as cut, copy, paste, move, delete, change style or font, print, change the spacing, or any other operation. It is noted that the left press button 102a and the right press button 102b are designed not to be sensitive to light pressure, such that they cannot be depressed easily, so as to avoid inadvertent depression of the press buttons. This design functions to avoid unintentional prompting of the highlighting mode, and other choice selections, with the left press button 102a and the right press button 102b. The touch screen, touch pad, glide point, or touch panel 103a associated with the left press button 102a and/or the right touch panel, touch screen, touch pad, or glide point 103b associated with the right press button 102b, however, remains sensitive to light touch or tapping so as to manipulate the screen selector or arrow for pointing, highlighting, repositioning of the cursor, opening of windows, or for selection of other functions as so desired.

Figure 2:
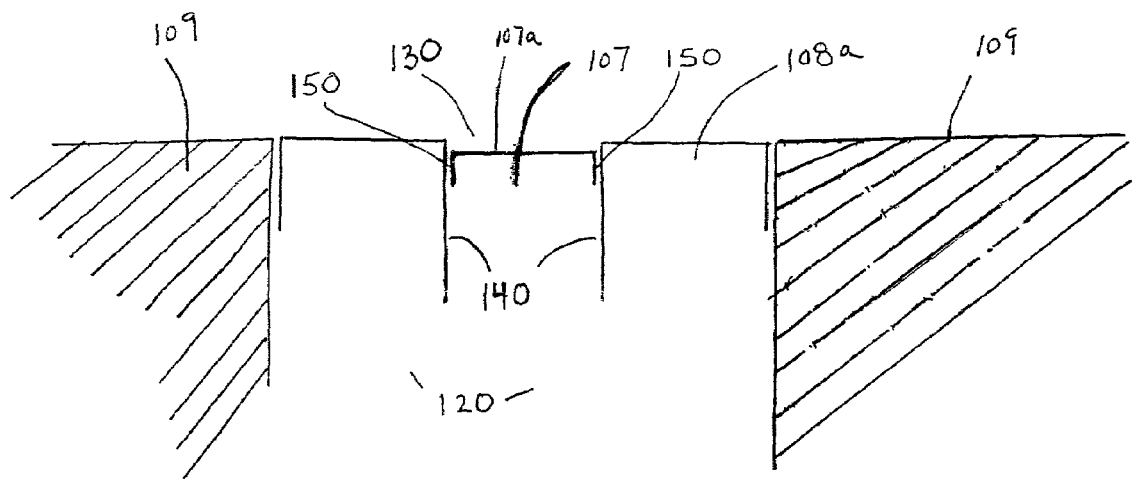
FIG. 2 is a sectional view of a press button mouse system having a touch screen, touch panel, touch pad, or glide point built, molded, or manufactured into the press button.

FIG. 2 shows a cross section of a mouse system 107 and 108a positioned in a cutout portion or void 120 in the walls 109 of a portable computer. The touch pad, touch panel, touch screen, or glide point 107, built, molded, or manufactured into a press button 108a. For portable computers, such as laptop computers, the mouse system 107 and 108a can be integrated into a cutout portion 120 formed in the housing. It is seen from FIG. 2 that an opening 130 is present in the press button 108a for positioning of the touch pad, touch screen, touch panel, or glide point 107. The periphery or peripheral sides 150 of the touch pad, touch screen, touch panel, or glide point, are surrounded by the walls 140 formed in the press button 108a. The touch pad, touch screen, touch panel, or glide point 107 is built, molded, or manufactured in the opening 130 formed in the press button 108a. Note that the touch pad, touch screen, touch panel, or glide point 107 has a touch surface 107a disposed on the outer surface of the touch pad, touch screen, touch panel, or glide point 107.

In addition, a backlit area can be incorporated into the press button such that an area is illuminated when the press button is initially pressed, so as to indicate that the highlighting mode has been activated, and darkened when the press button is pressed again to release the highlighting mode.

Figure 3:
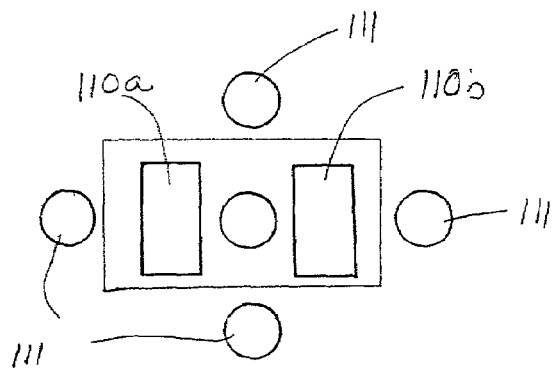
FIG. 3 is a schematic top view drawing showing different positions for the touch pad, touch screen, touch panel, or glide point relative to the left and right press buttons, press and lock buttons, or sliding panel buttons.

As an alternative to the left touch screen, glide point, touch pad, or touch panel 103a being built, molded, or manufactured into the left press button 102a and/or the right touch pad, touch panel, touch screen, or glide point 103b being built, molded, or manufactured into right press button 102b for the laptop or notebook computer mouse system 100, the touch screen, glide point, touch pad, or touch panel 111, as shown in FIG. 3, can be located in between the left press button 110a and the right press button 110b, on the left side of the left press button 110a and the right press button 110b, or on the right side of the left press button 110a and the right press button 110b, adjacent and on the front side of the left press button 110a and the right press button 110b, or adjacent and below the left press button 110a and the right press button 110b. The same method of operation, as previously recited, for manipulating the left press button 110a and/or the right press button 110b and the touch pad, glide point, touch screen, or touch panel 111, applies in all these alternative designs. It is noted that the buttons 110a and 110b of FIG. 3 will be referred to as press buttons, press and lock buttons, and sliding panel buttons depending on the embodiment in which the buttons are referenced.

Figure 4:
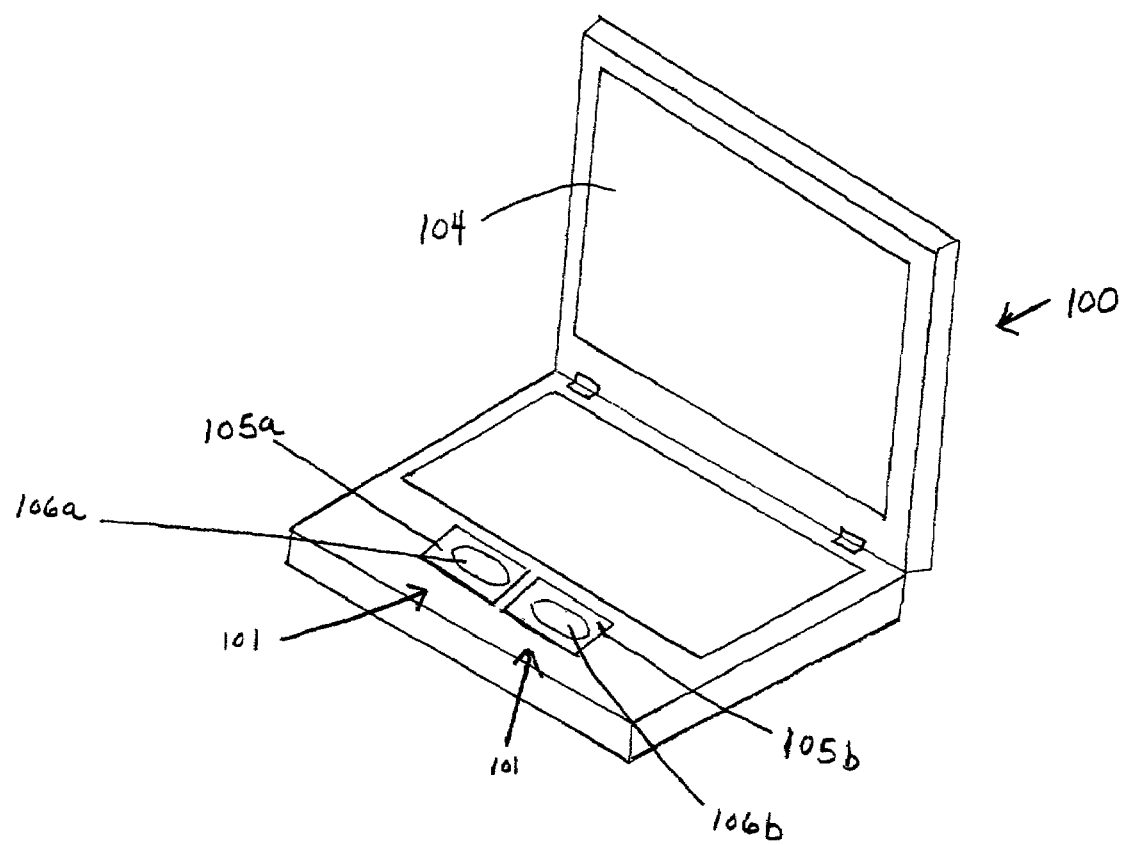
FIG. 4 is a right side perspective view of a laptop or notebook computer having a press and lock touch button mouse system of the instant invention. The mouse system has the touch pad, touch screen, touch panel, or glide point built, molded, or manufactured into the left and right press and lock buttons.
Figure 5A:
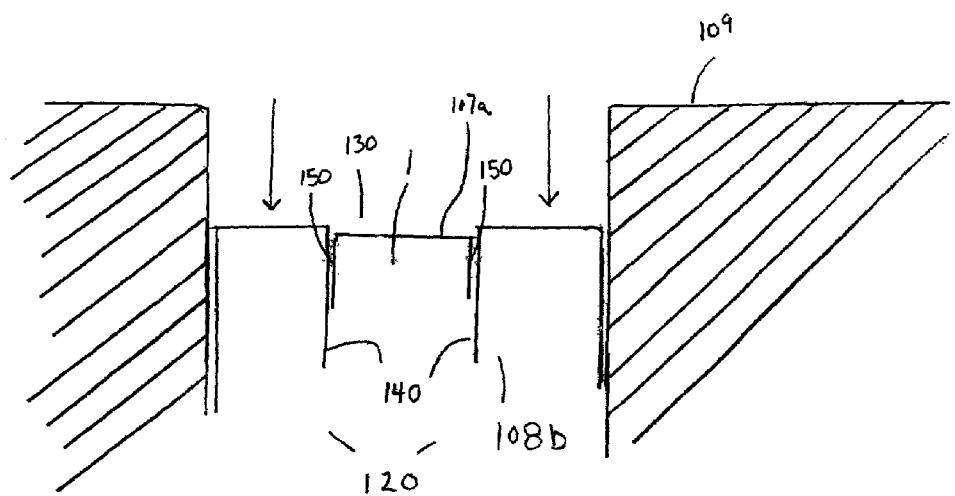
FIG. 5A is a sectional view of a press and lock touch button having the touch pad, touch screen, touch panel, or glide point built, molded, or manufactured therein where the button is pressed vertically downward into a locked position within the cutout of the computer cabinet or housing.
Figure 5B:
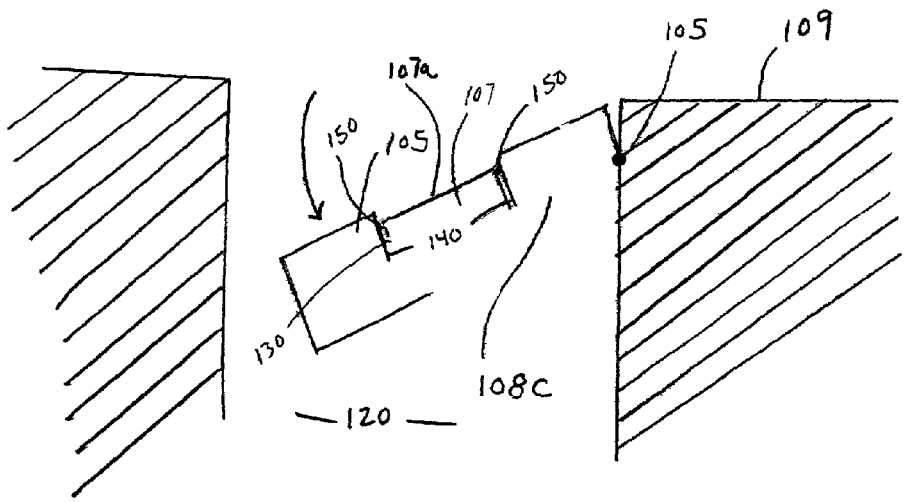
FIG. 5B is a sectional view of a press and lock touch button having the touch pad, touch screen, touch panel, or glide point built, molded, or manufactured therein where one side of the press and lock button is pressed downward while the other side pivots.

A modification to using the left press button 102a and the right press button 102b, wherein the buttons are pressed, released, and immediately return to their original position upon release, is to depress at least one press and lock button 105 from an original position to a depressed or locked position, wherein the at least one press and lock button 105 remains in the depressed or locked position. FIGS. 5a and 5b depict cross sections of the press and lock buttons 108b and 108c, respectively, with a touch pad, touch screen, touch panel, or glide point 107 built, molded, manufactured therein. FIGS. 5a and 5b each show a cross section of a mouse system 107 and 108 positioned in a cutout portion or void 120 in the walls 109 of a portable computer The touch pad, touch panel, touch screen, or glide point 107 is built, molded, or manufactured into press and lock buttons 108b and 108c. For portable computers such as laptop computers, the mouse system 107 and 108 can be integrated into a cutout portion 120 formed in the housing. It is seen from FIGS. 5a and 5b that an opening 130 is present in the mouse press and lock buttons 108b and 108c for positioning of the touch pad, touch screen, touch panel, or glide point 107. The periphery or peripheral sides 150 of the touch pad, touch screen, touch panel, or glide point, are surrounded by the walls 140 formed by the mouse press and lock buttons 108b and 108c. The touch pad, touch screen, touch panel, or glide point 107 is built, molded, or manufactured in the opening 130 formed in the mouse press and lock buttons 108b and 108c. Note that the touch pad, touch screen, touch panel, or glide point 107 has a touch surface 107a disposed on the outer surface of the touch pad, touch screen, touch panel, or glide point 107. As an example, a user of the new and improved laptop or notebook computer mouse system 101, as shown in FIG. 4, desiring to cut, copy, paste, move, delete, change the style or font of, print, change the spacing of, or perform any other operation on, a section of text would first locate the arrow or screen selector to the desired position in the text displayed on a computer monitor 104, or other monitoring device, used with the laptop or notebook computer mouse system 100, by using the left touch pad, glide point, touch screen, or touch panel 106a integrated, built, molded, or manufactured into the left press and lock button 105a and/or the right touch panel, touch pad, touch screen, or glide point 106*b* integrated, built, molded, or manufactured on the right press and lock button 105*b*. This is accomplished by lightly touching and moving a finger or other object over the surface of the left touch screen, touch panel, glide point, or touch pad 106*a* located on the left press and lock button 105*a* and/or the right touch panel, touch screen, touch pad, or glide point 106*b* located on the right press and lock button 105*b*. When the screen selector is in the desired position in the displayed text, the user then taps the left touch screen, touch pad, glide point, or touch panel 106*a* of the left press and lock button 105*a* or the right touch pad, touch screen, touch panel, or glide point 106*b* of the right press and lock button 105*b* to position the cursor at the starting point of the text to be highlighted. Next, the user depresses the left press and lock button 105*a* or the right press and lock button 105*b*, at least once, such that the press and lock button remains in the depressed or locked position, which prompts the computer software and/or computer operating system that highlighting will be the next mode of operation. It is noted that the user does not manually hold the press and lock button in the depressed or locked position. The user then uses the left touch screen, touch pad, glide point, or touch panel 106*a* located on the left press and lock button 105*a*, or the right touch panel, touch pad, glide point, or touch screen 106*b* located on the right press and lock button 105*b*, to highlight the selected text to be cut, copied, pasted, moved, deleted, changed in style or font, printed, changed in spacing, or any other operation. After highlighting the selected text, the user presses the depressed or locked left press and lock button 105*a* or the depressed or locked right press and lock button 105*b* which returns the press and lock button from the depressed or locked position back to the original position. This also releases or disengages the computer software and/or computer operating system from the highlighting mode. The user then uses the left touch screen, touch panel, glide point, or touch pad 106*a* on the left press and lock button 105*a*, or the right touch pad, touch screen, touch panel, or glide point 106*b* on the right press and lock button 105*b*, to manipulate the screen selector or arrow, by pointing to an icon or opening a window, for example, to select the desired operation to be performed on the highlighted text, such as; cutting, copying, pasting, moving, deleting, changing style or font, printing, changing the spacing, or any other operation.

With reference to FIG. 5*b*, the press and lock button 108*c* may pivot in that one end of the button moves downward while the other end pivots during pressing of the press and lock button 108*c*. The press and lock button 108*c* may, alternatively, pivot at its center. Also, the entire press and lock button 108*b* may be depressed, as shown in FIG. 5*a*, where it locks at a level lower than the upper surface of the walls 109 of the portable computer. The press and lock button may also lock at a level higher than the upper surface of the walls 109.

In addition, a backlit area can be incorporated into the press and lock button such that an area is illuminated when the press and lock button is initially depressed and locked, so as to indicate that the highlighting mode has been activated, and darkened when the depressed press and lock button is pressed again to return the depressed press and lock button back to its original position.

As an alternative to the left touch screen, glide point, touch pad, or touch panel 106*a* being built, molded, or manufactured into the left press and lock button 105*a* and/or the right touch pad, touch screen, touch panel, or glide point, 106*b* being built, molded, or manufactured into the right press and lock button 105*b* for the laptop or notebook computer mouse system 101, FIG. 3 shows the touch screen, glide point, touch pad, or touch panel 111 can be located in between the left press and lock button 110*a* and the right press and lock button 110*b*, on the left side of the left press and lock button 110*a* and the right press and lock button 110*b*, or on the right side of the left press and lock button 110*a* and the right press and lock button 110*b*, adjacent and on the front side of the left press and lock button 110*a* and the right press and lock button 110*b*, or adjacent and below the left press and lock button 110*a* and the right press and lock button 110*b*. The same method of operation, as previously recited, for manipulating the left press and lock button 110*a* and/or the right press and lock button 110*b* and the touch pad, glide point, touch screen, or touch panel 111, applies in all these alternative designs.

Figure 6:
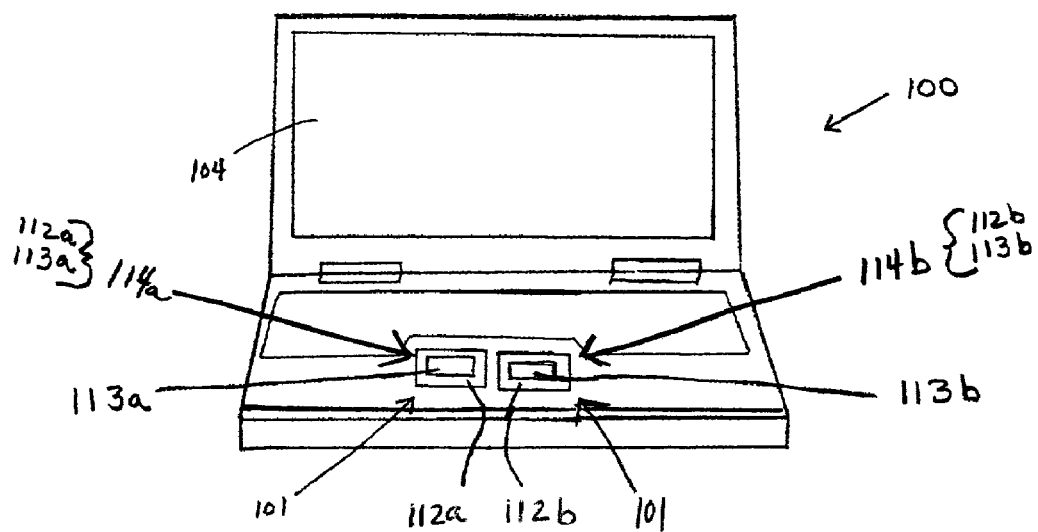
FIG. 6 is a front perspective view of a laptop or notebook computer having a sliding panel touch button mouse system of the instant invention with the mouse system having the touch pad, touch screen, touch panel, or glide point built, molded, or manufactured into the left and right sliding panel touch buttons.
Figure 24:
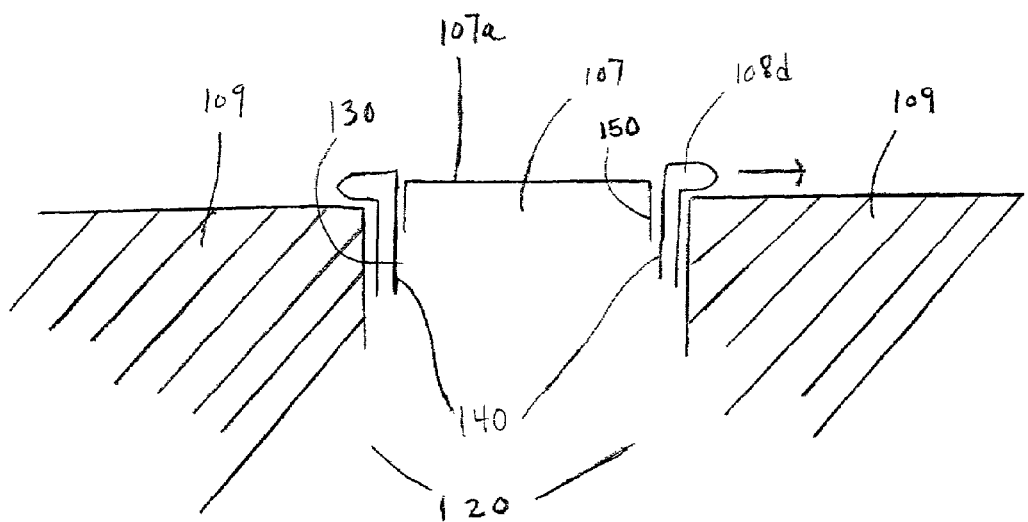
FIG. 24 a sectional view of a sliding panel touch button having the touch pad, touch screen, touch panel, or glide point built, molded, or manufactured therein where the button slides from an original position to a second position.

A further modification is to provide a sliding panel or sliding button 112 having a touch screen, touch panel, glide point, or touch pad 113 for the laptop or notebook computer mouse system 101, as shown in FIG. 6. At least one sliding panel 112 is provided with a touch screen, touch panel, glide point, or touch pad 113 built, molded, or manufactured into the at least one sliding panel 112 forming at least one sliding panel touch button 114. An advantage to providing a sliding panel 112 formed with a touch screen, touch panel, glide point, or touch pad 113 is that only one hand, finger, or other object is needed by the user to manipulate the laptop or notebook computer mouse system 101. Additionally, space is saved. FIG. 24 shows a cross-section of a mouse system 107 and 108*d* positioned in a cutout portion or void 120 in the walls 109 of a portable computer. The touch pad, touch panel, touch screen, or glide point 107, is built, molded, or manufactured into a sliding panel button 108*d*. Note that the touch pad, touch screen, touch panel, or glide point 107 has a touch surface 107*a* disposed on the outer surface of the touch pad, touch screen, touch panel, or glide point 107. For portable computers, such as laptop computers, the mouse system 107 and 108*d* can be integrated into a cutout portion 120 formed in the housing. It is seen from FIG. 24 that an opening 130 is present in the sliding button 108*d* for positioning of the touch pad, touch screen, touch panel, or glide point 107. The periphery or peripheral sides 150 of the touch pad, touch screen, touch panel, or glide point, 107, are surrounded by the walls 140 formed in the sliding panel button 108*d*. The touch pad, touch screen, touch panel, or glide point 107 is built, molded, or manufactured in the opening 130 formed in the sliding panel button 108*d*. As an example, a user of this new and improved design desiring to cut, copy, paste, move, delete, change the style or font of, print, change the spacing of, or perform any other operation on, a desired section of text displayed on a computer monitor 104, or other type of monitoring device used in conjunction with the laptop or notebook computer mouse system, would first locate the arrow or screen selector to the desired position in the displayed text using the left sliding panel touch button 114*a* and/or the right sliding panel touch button 114*b* by lightly touching and moving a finger or other object over the surface of the left sliding panel touch screen, glide point, touch panel, or touch pad 113*a* or the right sliding panel touch screen, touch panel, glide point, or touch pad 113*b*. After the screen selector or arrow has been positioned at the starting point of the text intended to be highlighted, the user then taps the left touch screen, touch pad, glide point, or touch panel 113*a* located on the left sliding panel 112*a* or the right touch screen, glide point, touch pad, or touch panel 113*b* located on the right sliding panel 112*b* to position the cursor at the starting point of the text intended to be highlighted. Next, the user slides the left sliding panel touch button 114a or the right sliding panel touch button 114b from an original position to a position which prompts the computer software and/or computer operating system that highlighting will be the next mode of operation. The user then uses the left touch pad, glide point, touch panel, or touch screen 113a of the left sliding panel 112a and/or the right touch pad, glide point, touch panel, or touch screen 113b of the right sliding panel 112b to highlight the desired text by lightly touching, brushing, rubbing by moving a finger or other object over the surface of the left sliding panel 112a touch pad, glide point, touch screen, or touch panel 113a or the right sliding panel 112b touch panel, touch screen, glide point, or touch pad 113b. Next, the user slides the left sliding panel touch button 114a or the right sliding panel touch button 114b, back to the original position which releases or disengages the computer software and/or computer operating system from the highlighting mode, but retains the highlighted text as displayed on the monitor 104. The user then uses the left sliding panel 112a touch pad, glide point, touch panel, or touch screen 113a or the right sliding panel 112b touch screen, touch pad, glide point, or touch panel 113b to manipulate the screen selector or arrow, by pointing to an icon or opening a window, for example, to select the desired operation to be performed on the highlighted text, such as cutting, copying, pasting, moving, deleting, changing style or font, printing, changing the spacing, or any other operation.

As an alternative to the left touch screen, glide point, touch pad, or touch panel 113a being built, molded, or manufactured into the left sliding panel button 112a and/or the right touch pad, touch screen, touch panel, or glide point, 113b being built, molded, or manufactured into the right sliding panel button 112b for the laptop or notebook computer mouse system 101, the touch screen, glide point, touch pad, or touch panel 111, as shown in FIG. 3, can be located in between the left sliding panel button 110a and the right sliding panel button 110b, on the left side of the left sliding panel button 110a and the right sliding panel button 110b, or on the right side of the left sliding panel button 110a and the right sliding panel button 110b, adjacent and on the front side of the left sliding panel button 110a and the right sliding panel button 110b, or adjacent and below the left sliding panel button 110a and the right sliding panel button 110b, as shown in FIG. 3. The same method of operation, as previously recited, for manipulating the left sliding panel button 110a and/or the right sliding panel button 110b and the touch pad, glide point, touch screen, or touch panel 111, applies in all these alternative designs.

External or Auxiliary Computer Mouse System

Figure 7:
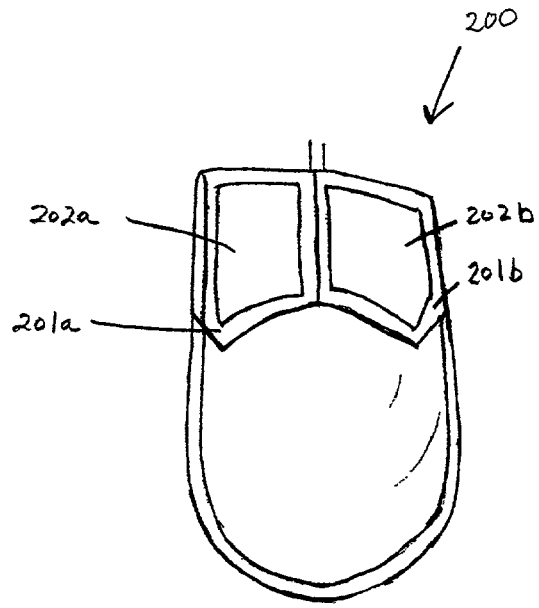
FIG. 7 is top view of an external or auxiliary mouse system of the instant invention used in conjunction with personal computers, laptop computers, home computers, office computers, desktop computers, and any other type of computer which is capable of using or functioning with an external or auxiliary mouse system. The left press button and the right press button each have a touch screen, touch panel, glide point, or touch pad built, molded, or manufactured therein.
Figure 8:
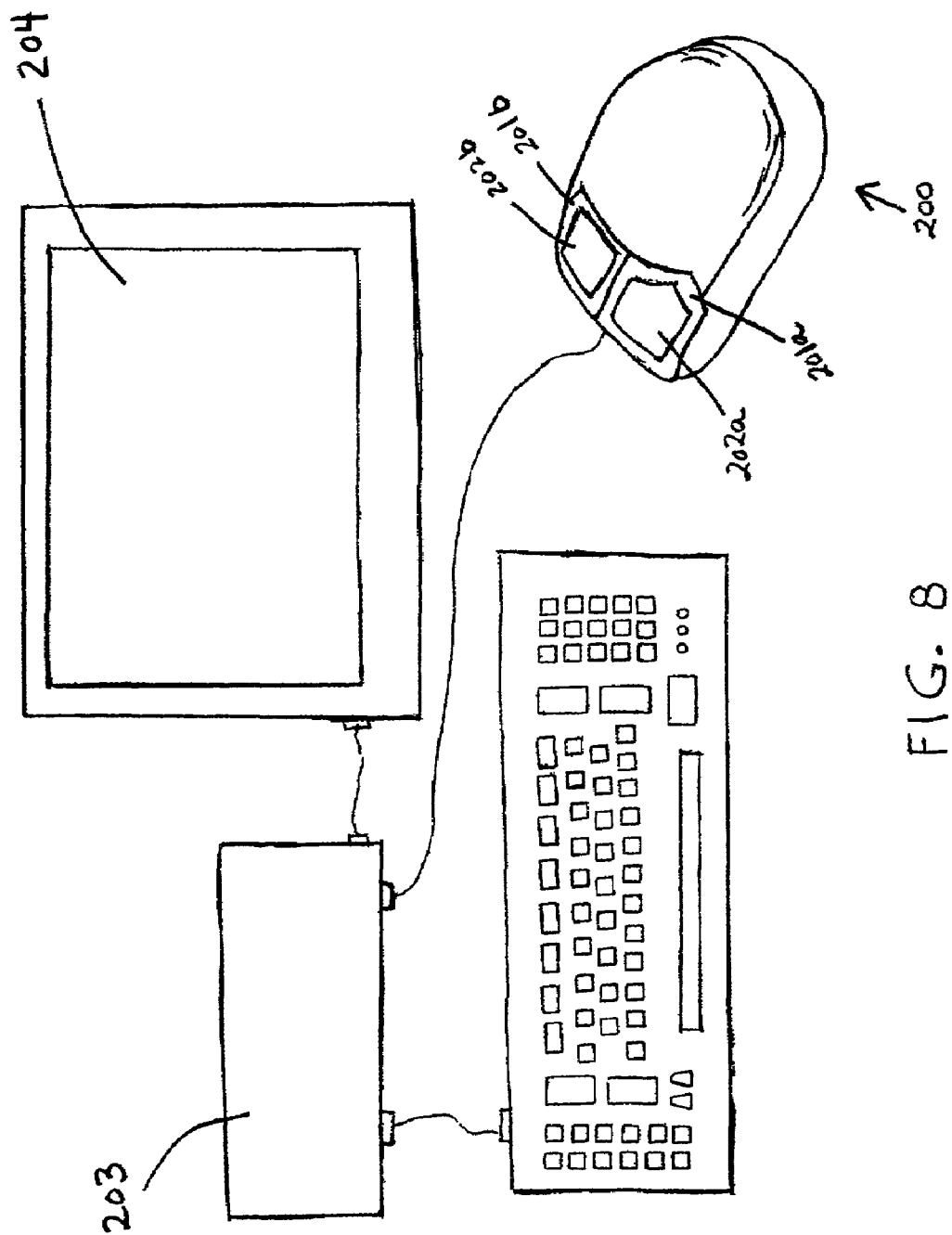
FIG. 8 is a front perspective view of a computer system composed of a central processing unit connected to a monitor, keyboard, and the external or auxiliary computer mouse system of the instant invention. The computer system is used in conjunction with the external mouse system of the instant invention, as described in FIG. 7.

A new and improved external or auxiliary computer mouse system of the instant invention, as shown in FIG. 7, can be used with personal computers, laptop or notebook computers, palmtop computers, personal organizers, home computers, office computers, handspring computers, visor computers, pocket pc's, desktop computers, and any other type of computer which is capable of using an external or auxiliary mouse system 200. The external or auxiliary mouse system 200 is a stand-alone mouse system and is apart, or separate from a central processing unit and/or monitor. The external or auxiliary mouse system 200 is connected by way of at least one port to a central processing unit 203, as depicted in FIG. 8. The external or auxiliary mouse system 200 of the instant invention has at least one press button 201 and at least one touch pad, touch panel, touch screen, or glide point 202 built, molded, or manufactured therein. For example, the external or auxiliary mouse system can have a left press button 201a and a right press button 201b as depicted in FIGS. 7 and 8. However, the invention is not limited to use of only one or two press buttons. The left press button 201a and the right press button 201b have left and/or right touch screens, touch pads, glide points, or touch panels, 202a and 202b, respectively, built, manufactured, or molded therein. An advantage of providing the touch screen, touch pad, glide point, or touch panel 202a and 202b integrated, built, molded, or manufactured into and on the surface of the left press button 201a and/or the right press button 201b is that only one hand, finger, or object is necessary by the user to manipulate the external or auxiliary computer mouse system 200 for performing computer related operations or functions. Additionally, when using the external or auxiliary computer mouse system 200 of the instant invention, it is no longer necessary to move the bottom of the mouse system across a surface to position the arrow or screen selector displayed on the monitor 204 That is, movement of the external or auxiliary mouse system 200 of the instant invention is not required for positioning the arrow or screen selector. The instant invention also eliminates the need for mouse system pads conventionally used in conjunction with the trackball type mouse designs, but does not restrict their use. The external or auxiliary mouse system 200 of the instant invention can be positioned on a surface desirable to the user of the instant external or auxiliary mouse system 200. The need to move the external or auxiliary mouse 200 across a surface to perform functions such as pointing, as in the prior art, is completely eliminated with the instant external or auxiliary computer mouse system 200. As an example, a user of the new and improved external or auxiliary mouse system 200 design desiring to cut, copy, paste, move, delete, change the style or font of, print, change the spacing of, or perform any other operation on, a section of text displayed on the computer monitor 204, or any other monitor associated with the external or auxiliary mouse system, would first locate the arrow or screen selector to the desired position in the text using the left touch pad, glide point, touch screen, or touch panel 202a located on the left press button 201a and/or the right touch screen, touch pad, glide point, touch panel 202b located on right press button 201b by lightly touching and moving a finger or other object over the surface of the touch screen, touch panel, glide point, or touch pad 202a and/or 202b. When the screen selector is in the desired position in the displayed text, the user then taps the left touch screen, touch pad, glide point, or touch panel 202a located on the left press button 201a and/or the right touch pad, glide point, touch panel, or touch screen 202b located on the right press button 201b to position the cursor at the starting point in the displayed text intended to be highlighted. The user then presses and releases the left press button 201a or right press button 201b, at least once, such that the left press button 201a or right press button 201b returns to the original position after the pressure applied to press the press button is removed. This prompts the computer software and/or computer operating system that highlighting will be the next mode of operation. The user then uses the left touch pad, glide point, touch screen, or touch panel 202a of the left press button 201a or the right touch panel, touch screen, glide point, or touch pad 202b of the right press button 201b to highlight the desired text by lightly touching and moving a finger or other object over the surface of the left press button 201a touch screen, glide point, touch pad, or touch panel 202a or the right press button 201b touch screen, touch pad, glide point, or touch panel 202b. Next, the user depresses and releases the left press button 201a or the right press button 201b again, such that the left press button 201a or the right press button 201b returns to the original position after the pressure applied to press the press button is removed, which also releases or disengages the computer software and/or computer operating system from the highlighting mode. The user then uses the left touch screen, touch panel, glide point, or touch pad 202a of the left press button 201a or the right touch pad, glide point, touch screen, or touch panel 202b of the right press button 201b to manipulate the screen selector or arrow to select, by pointing to an icon or opening a window, for example, the desired operation intended to be performed on the highlighted text; such as to cut, copy, paste, move, delete, change the style or font, print, change the spacing, or perform any other operation. It is noted that the left press button's 201a touch screen, touch pad, glide point, or touch panel 202a and the right press button's 201b touch screen, touch pad, glide point, or touch panel 202b are not sensitive to lightly applied pressure so as to avoid easy depression of the press buttons. This design functions to avoid unintentional prompting of the highlighting mode. The left touch screen, touch pad, glide point, or touch panel 202a of the left press button 201a and the right touch screen, touch pad, glide point, or touch panel 202b of the right press button 201b, however, remain sensitive to light touch or tapping so as to manipulate the screen selector or arrow for highlighting, repositioning of the cursor, opening of windows, or for selection of other functions.

In addition, a backlit area can be incorporated into the press button such that an area is illuminated when the press button is initially pressed, so as to indicate that the highlighting mode has been activated, and darkened when the press button is pressed again to indicate release of the highlighting mode.

An alternative to the left touch screen, touch pad, glide point, or touch panel 202a being integrated, built, manufactured, or molded into the left press button 201a and/or the right touch pad, glide point, touch panel, or touch screen 202b being integrated, built, molded, or manufactured into the right press button 201b for the external or auxiliary mouse system 200, as shown in FIGS. 7 and 8, is that shown in FIG. 3 wherein the touch screen, touch pad, glide point, or touch panel 111 can be located in between the left press button 110a and the right press button 110b, or on the left side of the left press button 110a and the right press button 110b, or on the right side of the left press button 110a and the right press button 110b, or adjacent and above the left press button 110a and the right press button 110b, or adjacent and below the left press button 110a and the right press button 110b. The same method of operation, as recited previously, for manipulating the left press button 110a and/or the right press button 110b and the separate touch pad, glide point, touch screen, or touch panel 111, applies in these alternative designs.

Figure 9:
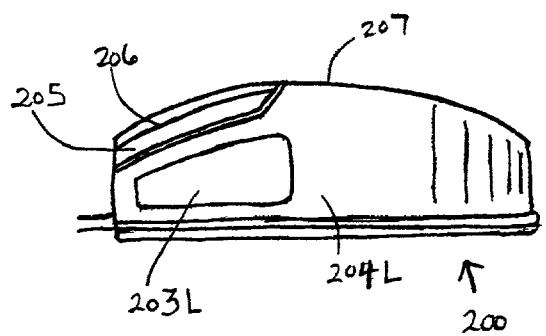
FIG. 9 is a left side-view of an external or auxiliary mouse system of the instant invention having a left press button and a right press button and a touch screen, touch panel, glide point, or touch pad located on the left sidewall of the external or auxiliary mouse system.
Figure 10:
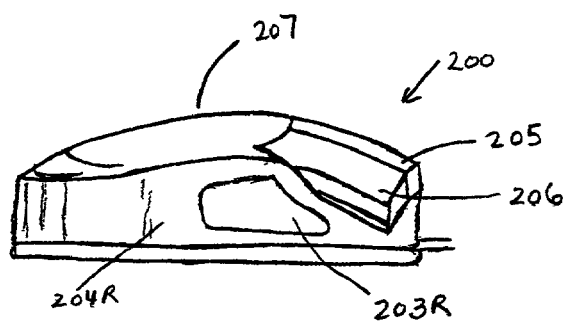
FIG. 10 is a right side-view of an external or auxiliary mouse system of the instant invention having a left press button and a right press button and a touch screen, touch panel, glide point, or touch pad located on the right side-wall of the external mouse system.

A further modification for placement of the left touch screen, touch panel, glide point, or touch pad, is to locate the left touch panel, touch screen, glide point, or touch pad 203L on a left sidewall 204L of the external or auxiliary mouse system 200, as shown in FIGS. 9 and 10. Note that L and R denote left and right, respectively. In this modification, the user can manipulate the arrow or screen selector by touching and lightly rubbing or brushing the left touch pad, glide point, touch screen, or touch panel 203L, located on the left sidewall 204L of the external or auxiliary mouse system 200, using the thumb, and manipulate the left press button 205 and/or the right press button 206, which is positioned on the top surface 207 of the external or auxiliary mouse system 200, with other fingers or objects, if so desired. As an example, a user of the new and improved external or auxiliary computer mouse system 200 desiring to cut, copy, paste, move, delete, change the style or font of, print, change the spacing of, or perform any other operation on, a section of text displayed on a computer monitor 204, or any other type of monitor associated with the external or auxiliary computer mouse system 200, would first locate the arrow or screen selector to the desired position in the text displayed on the monitor 204 by using the left touch pad, glide point, touch screen, or touch panel 203L located on the left sidewall 204L and/or the right touch panel, touch screen, glide point, touch pad, 203R located on the right sidewall 204R of the external or auxiliary mouse system 200 by lightly touching and moving a thumb, other finger, or other object over the surface of the left touch screen, touch panel, glide point, or touch pad 203L positioned on the left sidewall 204L and/or the right touch pad, glide point, touch screen, or touch panel 203R positioned on the right sidewall 204R of the external or auxiliary mouse system 200. When the screen selector or arrow has been located to the starting position in the text intended to be highlighted, the user then taps the left touch screen, touch pad, glide point, or touch panel 203L on the left sidewall 204L with the right thumb for a right-handed mouse and/or the right touch pad, touch screen, touch panel, or glide point 203R on the right sidewall 204R with a right ring finger, middle finger, or right index finger for a right-handed mouse system. It is noted that for a left-handed mouse system, the left thumb would manipulate the right touch screen, touch pad, touch panel, or glide point 203R located on the right sidewall 204R and the left ring finger, index finger, or middle finger would manipulate the left touch pad, touch screen, touch panel, or glide point 203L located on the left sidewall 204L. This step positions the cursor at the starting point of the text to be highlighted. Next, the user depresses and releases the left press button 205 or right press button 206, at least once, using a finger or other desired object, such that the pressed press button returns to its original position after the pressure applied to press the press button is removed. This prompts the computer software and/or computer operating system that highlighting will be the next mode of operation. The user then uses the left touch screen, touch pad, glide point, or touch panel 203L on the left sidewall 204L and/or the right touch panel, touch screen, glide point, or touch pad 203R on the right sidewall 204R of the external or auxiliary mouse system 200 to highlight the selected text to be cut, copied, pasted, moved, deleted, changed in style or font, printed, change the spacing of, or any other operation, by lightly touching, brushing, rubbing or moving the thumb, other finger, or other object over the surface of left touch pad, glide point, touch screen, or touch panel 203L located on the left sidewall 204L or the right touch pad, glide point, touch panel, or touch screen 203R located on the right sidewall 204R. After highlighting the selected text, the user presses the left press button 205 or the right press button 206, again. This releases or disengages the computer software and/or computer operating system from the highlighting mode. The user then uses the left touch screen, touch panel, glide point, or touch pad 203L on the left sidewall 204L or the right touch panel, touch screen, glide point, or touch pad 203R on the right sidewall 204R of the external or auxiliary mouse system 200 to manipulate the screen selector or arrow, by pointing to an icon or opening a window, for example, for selecting the desired operation to be performed on the highlighted text; such as, cutting, copying, pasting, moving, deleting, changing the style or font, printing, changing the spacing, or any other operation.

It is noted that an alternative method of operating this external mouse system includes holding the press button down with the index finger while manipulating the touch pad, touch panel, glide point, or touch screen with the thumb to highlight the text and then releasing the press button at the conclusion of the highlighting step.

In addition, a backlit area can be incorporated into the press button such that an area of the button is illuminated when the press button is initially pressed, so as to indicate that the highlighting mode has been activated, and darkened when the press button is pressed again to release the highlighting mode.

An alternative to the press buttons which are pressed, released, and immediately return to their original position, is to depress at least one press and lock button 208 from an original position to a depressed or locked position wherein the at least one press and lock button, 208, remains in the depressed or locked position, as seen in FIG. 11. As an example, a user of the new and improved external or auxiliary computer mouse system 200 desiring to cut, copy, paste, move, delete, change the style or font of, print, change the spacing of, or perform any other operation on, a section of text displayed on a computer monitor 204, or any other type of monitor associated or connected with the external or auxiliary mouse system 200, would first locate the arrow or screen selector to the desired position in the text using the left touch pad, glide point, touch screen, or touch panel 209a located on the left press and lock button 208a and/or the right touch panel, touch screen, glide point, touch pad 209b located on the right press and lock button 208b by lightly touching and moving a finger or other object over the surface of the left touch screen, touch panel, glide point, or touch pad 209a positioned on the left press and lock button 208a and/or the right touch screen, touch panel, glide point, or touch pad 209b positioned on the right press and lock button 208b. When the screen selector or arrow has been located to the starting position in the text intended to be highlighted, as displayed by a monitor 204, the user then taps the left or right touch screen, touch pad, glide point, or touch panel 209a or 209b, respectively, to position the cursor at the starting point of the text to be highlighted. Next, the user depresses the left press and lock button 208a or the right press and lock button 208b from an original position such that the left press and lock button 208a or the right press and lock button 208b remains in the depressed or locked position. This prompts the computer software and/or computer operating system that highlighting will be the next mode of operation. The user then uses the left touch screen, touch pad, glide point, or touch panel 209a located on the left press and lock button 208a and/or the right touch panel, touch pad, glide point, or touch screen 209b located on the right press and lock button 208b, to highlight the selected text to be cut, copied, pasted, moved, deleted, changed in style or font, printed, change the spacing of, or to perform any other operation. After highlighting the selected text, the user presses the left press and lock button 208a or the right press and lock button 208b which returns the press and lock button 208a or 208b, respectively, from the depressed or locked position back to the original position. This also releases or disengages the computer software and/or computer operating system from the highlighting mode. The user then uses the left touch screen, touch panel, glide point, or touch pad 209a on the left press and lock button 208a or the right touch pad, glide point, touch screen, touch panel 209b on the right press and lock button 208b to manipulate the screen selector or arrow, by pointing to an icon or opening a window, for example, to select the desired operation to be performed on the highlighted text; such as, cutting, copying, pasting, moving, deleting, changing style or font, printing, changing the spacing of, or any other operation.

In addition, a backlit area can be incorporated into the press and lock button such that an area is illuminated when the press and lock button is initially depressed and locked, so as to indicate that the highlighting mode has been activated, and darkened when the depressed press and lock button is pressed again to return the depressed press and lock button back to its original position.

An alternative to the left touch screen, glide point, touch pad, or touch panel 209a, being built, manufactured, or molded into the left press and lock button 208a and/or the touch screen, touch panel, touch pad, glide point 209b being built, molded, or manufactured into the right press and lock button 208b for the external or auxiliary mouse system 200, as shown in FIG. 11, is that shown in FIG. 3 wherein the touch screen, touch pad, glide point, or touch panel 111 can be located in between the left press and lock button 110a and the right press and lock button 110b, on the left side of the left press and lock button 110a and the right press and lock button 110b, on the right side of the left press and lock button 110a and the right press and lock button 110b, adjacent and on the front side of the left press and lock button 110a and the right press and lock button 110b, or adjacent and beneath the left press and lock button 110a and the right press and lock button 110b. The same method of operation, as recited previously, for manipulating the left press and lock button 110a and the right press and lock button 110b and the touch pad, glide point, touch screen, or touch panel 111, applies in these alternative designs.

A further modification for placement of the touch screen, touch panel, glide point, or touch pad, is to locate the touch panel, touch screen, glide point, or touch pad 210L on a sidewall 211L of the external or auxiliary mouse system 200, as shown in FIGS. 12 and 13. In this modification, the user can manipulate the arrow or screen selector by touching and lightly rubbing or brushing the touch pad, glide point, touch screen, or touch panel 210L, located on the left sidewall 211L of the external or auxiliary mouse system 200, using the thumb, and manipulate the left press and lock button 212 and/or the right press and lock button 213 positioned on the top surface 207 of the external or auxiliary mouse system 200 with other fingers or objects, if so desired. As an example, a user of the new and improved external or auxiliary computer mouse system 200 desiring to cut, copy, paste, move, delete, change the style or font of, print, change the spacing of, or perform any other operation on, a section of text displayed on a computer monitor 204, or any other type of monitor associated with the external or auxiliary computer mouse system 200, would first locate the arrow or screen selector to the desired position in the text displayed on the monitor 204 by using the left touch pad, glide point, touch screen, or touch panel 210L located on the left sidewall 211L and/or the right touch panel, touch screen, glide point, touch pad, 210R located on the right sidewall 211R of the external or auxiliary mouse system 200 by lightly touching and moving a thumb, other finger, or other object over the surface of the left touch screen, touch panel, glide point, or touch pad 210L positioned on the left sidewall 211L and/or the right touch pad, glide point, touch screen, or touch panel 210R positioned on the right sidewall 211R of the external or auxiliary mouse system 200. When the screen selector or arrow has been located to the starting position in the text intended to be highlighted, the user then taps the left touch screen, touch pad, glide point, or touch panel 210L on the left sidewall 211L with the right thumb for a right-handed mouse and/or the right touch pad, touch screen, touch panel, or glide point 210R on the right sidewall 211R with a right ring finger, right middle finger, or right index finger for a right-handed mouse system. It is noted that for a left-handed mouse system, the left thumb would manipulate the right touch screen, touch pad, touch panel, or glide point 210R located on the right sidewall 211R and the left ring finger, left index finger, or left middle finger would manipulate the left touch pad, touch screen, touch panel, or glide point 210L located on the left sidewall 211L. This step positions the cursor at the starting point of the text to be highlighted. Next, the user depresses and releases the left press and lock button 212 or right press and lock button 213, using a finger or other desired object, such that the press and lock button 212 or 213 remains in a depressed or locked position after the pressure applied to press the press and lock button is removed. This prompts the computer software and/or computer operating system that highlighting will be the next mode of operation. The user then uses the left touch screen, touch pad, glide point, or touch panel 210L on the left sidewall 211L and/or the right touch panel, touch screen, glide point, or touch pad 210R on the right sidewall 211R of the external or auxiliary mouse system 200 to highlight the selected text to be cut, copied, pasted, moved, deleted, changed in style or font, printed, change the spacing of, or any other operation, by lightly touching, brushing, rubbing or moving the thumb, other finger, or other object over the surface of left touch pad, glide point, touch screen, or touch panel 210L located on the left sidewall 211L or the right touch pad, glide point, touch panel, or touch screen 210R located on the right sidewall 211R. After highlighting the selected text, the user presses the depressed or locked left press and lock button 212 or the depressed or locked right press and lock button 213, again. This releases or disengages the computer software and/or computer operating system from the highlighting mode. The user then uses the left touch screen, touch panel, glide point, or touch pad 210L on the left sidewall 211L or the right touch panel, touch screen, glide point, or touch pad 210R on the right sidewall 211R of the external or auxiliary mouse system 200 to manipulate the screen selector or arrow, by pointing to an icon or opening a window, for example, for selecting the desired operation to be performed on the highlighted text; such as, cutting, copying, pasting, moving, deleting, changing the style or font, printing, changing the spacing, or any other operation.

In addition, a backlit area can be incorporated into the press button, press and lock button, or sliding panel button, such that an area is illuminated when the press button is pressed, the press and lock button is depressed and locked, or the sliding panel button is moved by sliding from its original position, so as to indicate that the highlighting mode has been activated. The backlit area is darkened when the press button is pressed again, the depressed press and lock button is pressed again to return it to its original position, or the sliding panel button is moved back to its original position.

A further alternative is to provide at least one sliding panel or sliding button 215 with a touch screen, touch panel, glide point, or touch pad 216 integrated, built, molded, or manufactured therein, hereafter referred to as a sliding panel touch button 217 for the external or auxiliary computer mouse system 200, as shown in FIG. 14. An advantage to providing at least one sliding panel touch button 217 is that only one hand, finger, or other object is needed by the user to manipulate the external or auxiliary mouse system 200. As an example, a user of this new and improved external or auxiliary mouse system 200 design desiring to cut, copy, paste, move, delete, change the style or font of, print, change the spacing of, or perform any other operation on, a desired section of text displayed on a computer monitor 204, or any other type of monitor, would first locate the arrow or screen selector to the desired position in the displayed text by lightly touching and moving a finger or other object over the surface of the left touch screen, touch panel, glide point, or touch pad 216a located on the left sliding panel touch button 217a and/or the surface of the right touch pad, touch screen, touch panel, or glide point located on the right sliding panel touch button 217b. The left sliding panel touch button 217a is constructed from a left sliding panel 215a and a left touch screen, touch panel, touch pad, or glide point 216a. The right sliding panel touch button 217b is constructed from a right sliding panel 215b and a right touch screen, touch panel, touch pad, or glide point 216b. After the screen selector or arrow has been positioned at the starting point of the text intended to be highlighted, the user then taps the left touch screen, touch pad, glide point, or touch panel 216a of the left sliding panel touch button 217a and/or the right touch panel, touch pad, glide point, or touch screen 216b of the right sliding panel touch button 217b to position the cursor at the starting point of the text intended to be highlighted. Next, the user slides the left sliding panel touch button 217a, as shown in FIG. 14, or the right sliding panel touch button 217b from an original position to a position which prompts the computer software and/or computer operating system that highlighting will be the next mode of operation. The displacement of the sliding panel touch button relative to its original position is represented by 218. The user then uses the left touch pad, glide point, touch panel, or touch screen 216a of the left sliding panel touch button 217a or the right touch pad, glide point, touch screen, or touch panel 216b of the right sliding panel touch button 217b to highlight the desired text by lightly touching, brushing, rubbing and moving a finger or other object over the surface of the left touch panel, touch screen, glide point, or touch pad 216a of the left sliding panel touch button 217a and/or the right touch pad, glide point, touch panel, or touch screen 216b of the right sliding panel touch button 217b. After the desired text has been highlighted, the user then slides the left sliding panel touch button 217a, or the right sliding panel touch button 217b, back to the original position which releases or disengages the computer software and/or computer operating system from the highlighting mode, but retains the highlighted text. The user then uses the left touch pad, glide point, touch screen, or touch panel 216a of the left sliding panel touch button 217a and/or the right touch panel, touch pad, glide point, or touch screen 216b of the right sliding panel touch button 217b to manipulate the screen selector or arrow, by pointing to an icon or opening a window, for example, to select the desired operation to be performed on the highlighted text, such as cutting, copying, pasting, moving, deleting, changing the style or font, printing, changing the spacing, or performing any other operation.

In addition, a backlit area can be incorporated into the sliding panel button such that an area is illuminated after sliding the sliding panel button from an original position to a position that indicates that the highlighting mode has been activated. The backlit button is then darkened when the sliding panel button is returned to its original position, indicating release of the highlighting mode.

An alternative to the left touch screen, touch pad, glide point, or touch panel 216a being integrated, built, manufactured, or molded into the left sliding panel button 215a and/or the right touch pad, glide point, touch panel, or touch screen 216b being integrated, built, molded, or manufactured into the right sliding panel button 215b for the external or auxiliary mouse system 200, as shown in FIG. 14, is that shown in FIG. 3 wherein the touch screen, touch pad, glide point, or touch panel 111 can be located in between the left sliding panel button 110a and the right sliding panel button 110b, or on the left side of the left sliding panel button 110a and the right sliding panel button 110b, or on the right side of the left sliding panel button 110a and the right sliding panel button 110b, or adjacent and above the left sliding panel button 110a and the right sliding panel button 110b, or adjacent and below the left sliding panel button 110a and the right sliding panel button 110b. The same method of operation, as previously recited, for manipulating the left sliding panel button 110a and/or the right sliding panel button 110b and the corresponding touch pad, glide point, touch screen, or touch panel 111, applies in these alternative designs A further modification for placement of the touch screens, touch panels, glide points, or touch pads 216a and 216b, is to locate the left touch panel, touch screen, glide point, or touch pad 219L on the left sidewall 220L of the external or auxiliary mouse system 200, as shown in FIGS. 15 and 16. In this modification, the user can manipulate the arrow or screen selector by touching and lightly rubbing or brushing the left touch pad, glide point, touch screen, or touch panel 219L, located on the left sidewall 220L of the external or auxiliary mouse system 200, using the thumb, other finger, or object and manipulate the left sliding button 221 and/or the right sliding panel button 222, which is positioned on the top surface 223 of the external or auxiliary mouse system 200 with other fingers or objects, if so desired. As an example, a user of the new and improved external or auxiliary computer mouse system 200 desiring to cut, copy, paste, move, delete, change the style or font of, print, change the spacing of, or perform any other operation on, a section of text displayed on a computer monitor 204 or any other type of monitor associated with the external or auxiliary computer mouse system 200 would first locate the arrow or screen selector to the desired position in the text displayed on the monitor 204 by using the left touch pad, glide point, touch screen, or touch panel 219L located on the left sidewall 220L and/or the right touch panel, touch screen, glide point, touch pad, 219R located on the right sidewall 220R of the external or auxiliary mouse system 200 by lightly touching and moving a thumb, other finger, or other object over the surface of the left touch screen, touch panel, glide point, or touch pad 219L positioned on the left sidewall 220L and/or the right touch pad, glide point, touch screen, or touch panel 219R positioned on the right sidewall 220R of the external or auxiliary mouse system 200. When the screen selector or arrow has been located to the starting position in the text intended to be highlighted, the user then taps the left touch screen, touch pad, glide point, or touch panel 219L on the left sidewall 220L with the right thumb for a right-handed mouse and/or the right touch pad, touch screen, touch panel, or glide point 219R on the right sidewall 220R with the right ring finger, middle finger, or right index finger, for example, for a right-handed mouse system. It is noted that for a left-handed mouse system, the left thumb would manipulate the right touch screen, touch pad, touch panel, or glide point 219R located on the right sidewall 220R and the left ring finger, left index finger, or left middle finger, for example, would manipulate the left touch pad, touch screen, touch panel, or glide point 219L located on the left sidewall 220L. This step positions the cursor at the starting point of the text to be highlighted. Next, the user slides the left sliding panel button 221 or right sliding panel button 222, using a finger or other desired object, such that the sliding panel button is displaced forward, backward, sideways, or diagonal from its original position. FIGS. 15 and 16 show a forward displacement of sliding panel 221. This prompts the computer software and/or computer operating system that highlighting will be the next mode of operation. The user then uses the left touch screen, touch pad, glide point, or touch panel 219L on the left sidewall 220L and/or the right touch panel, touch screen, glide point, or touch pad 219R on the right sidewall 220R of the external or auxiliary mouse system 200 to highlight the selected text to be cut, copied, pasted, moved, deleted, changed in style or font, printed, change the spacing of, or any other operation, by lightly touching, brushing, rubbing or moving the thumb, other finger, or other object over the surface of left touch pad, glide point, touch screen, or touch panel 219L located on the left sidewall 220L or the right touch pad, glide point, touch panel, or touch screen 219R located on the right sidewall 220R. After highlighting the selected text, the user slides the left sliding panel button 221 or the right sliding panel button 222 back to its original position. This releases or disengages the computer software and/or computer operating system from the highlighting mode. The user then uses the left touch screen, touch panel, glide point, or touch pad 219L on the left sidewall 220L or the right touch panel touch screen, glide point, or touch pad 219R on the right sidewall 220R of the external or auxiliary mouse system 200 to manipulate the screen selector or arrow, by pointing to an icon or opening a window, for example, for selecting the desired operation to be performed on the highlighted text; such as, cutting, copying, pasting, moving, deleting, changing the style or font, printing, changing the spacing, or any other operation.

A further modification to the external or auxiliary computer mouse system is to provide a left press button, left press and lock button, or left sliding panel button 224L on the left sidewall 225L, as shown in FIG. 17, and/or a right press button, right press and lock button, or right sliding panel button 224R on the right sidewall 225R with a touch screen, touch pad, glide point, or touch panel 226 on the top surface 227 of the external or auxiliary mouse system 200, as shown in FIG. 19. The buttons are reversed for a left-handed external or auxiliary computer mouse system 200. The left press button, left press and lock button, or left sliding panel button 224L located on the left sidewall 225L corresponds to the left thumb position of the user. The right press button, right press and lock button, or right sliding panel button 224R located on the right sidewall 225R corresponds to, for example, the right ring finger or right middle finger of the user. The same method of operation for manipulating the left and right press buttons, left and right press and lock buttons, and the left and right sliding panel buttons 224L and 224R, and the touch pad, glide point, touch screen, or touch panel 226, as previously presented, applies in this alternative. As an example, a user of the new and improved external or auxiliary computer mouse system 200 desiring to cut, copy, paste, move, delete, change the style or font of, print, change the spacing of, or perform any other operation on, a section of text displayed on a computer monitor 204, or any other type of monitor associated with the external or auxiliary computer mouse system 200, would first locate the arrow or screen selector to the desired position in the text displayed on the monitor 204 by using the touch pad, glide point, touch screen, or touch panel 226 located on the upper surface 227 of the external or auxiliary mouse system 200 by lightly touching and moving a thumb, other finger, or other object over the surface of the touch screen, touch panel, glide point, or touch pad 226 of the external or auxiliary mouse system 200. When the screen selector or arrow has been located to the starting position in the text intended to be highlighted, the user then taps the touch screen, touch pad, glide point, or touch panel 226 using a right finger for a right-handed mouse system. It is noted that for a left-handed mouse system, a left finger would manipulate the touch pad, touch screen, touch panel, or glide point 226 located on the upper surface 227. This step positions the cursor at the starting point of the text to be highlighted. Next, the user presses the left press button, the left press and lock button, or slides the left sliding panel button 224L or presses the right press button, presses the right press and lock button, or slides the right sliding panel button 224R, using a finger, thumb, or other desired object, such that the button is pressed for a press button, depressed and locked for a press and lock button, or displaced forward, backward, sideways, or diagonal from its original position for a sliding panel button. This prompts the computer software and/or computer operating system that highlighting will be the next mode of operation. The user then uses the touch screen, touch pad, glide point, or touch panel 226 of the external or auxiliary mouse system 200 to highlight the selected text to be cut, copied, pasted, moved, deleted, changed in style or font, printed, change the spacing of, or any other operation, by lightly touching, brushing, rubbing or moving the thumb, other finger, or other object over the surface of touch pad, glide point, touch screen, or touch panel 226. After highlighting the selected text, the user presses the left press button, presses the left press and lock button, or slides the left sliding panel button 224L back to its original position, or presses the right press button, presses the right press and lock button, or slides the right sliding panel button 224R back to its original position. This releases or disengages the computer software and/or computer operating system from the highlighting mode. The user then uses the touch screen, touch panel, glide point, or touch pad 226 of the external or auxiliary mouse system 200 to manipulate the screen selector or arrow, by pointing to an icon or opening a window, for example, for selecting the desired operation to be performed on the highlighted text; such as, cutting, copying, pasting, moving, deleting, changing the style or font, printing, changing the spacing, or any other operation. It is noted that for a left-handed mouse system of this modification, the left thumb can manipulate the right press button, right press and lock button, or right sliding panel located on the right sidewall and the left ring finger or middle finger, for example, can manipulate the left press button, left press and lock button, or left sliding panel located on the left side wall.

Additionally, a modification wherein the left and right press buttons, press and lock buttons, or sliding panel buttons 224L and 224R located on the left and right sidewalls 225L and 225R may have the touch screen, touch panel, glide point, or touch pad, 226 built, molded, or manufactured, therein. This would allow the upper surface 227 to be used for other purposes or functions. The same method for manipulating the touch pad, touch screen, touch panel, or glide point, 226 and the press button, press and lock button, and sliding panel button, 224L and 224R, as previously recited, applies herein.

In addition, a backlit area can be incorporated into the press button, press and lock button, or sliding panel button, such that an area is illuminated when the press button is pressed, the press and lock button is depressed and locked, or the sliding panel button is moved by sliding from its original position, so as to indicate that the highlighting mode has been activated. The backlit area is darkened when the press button is pressed again, the depressed press and lock button is pressed again to return it to its original position, or the sliding panel button is moved back to its original position.

External Computer Keyboard Mouse System

Figure 20:
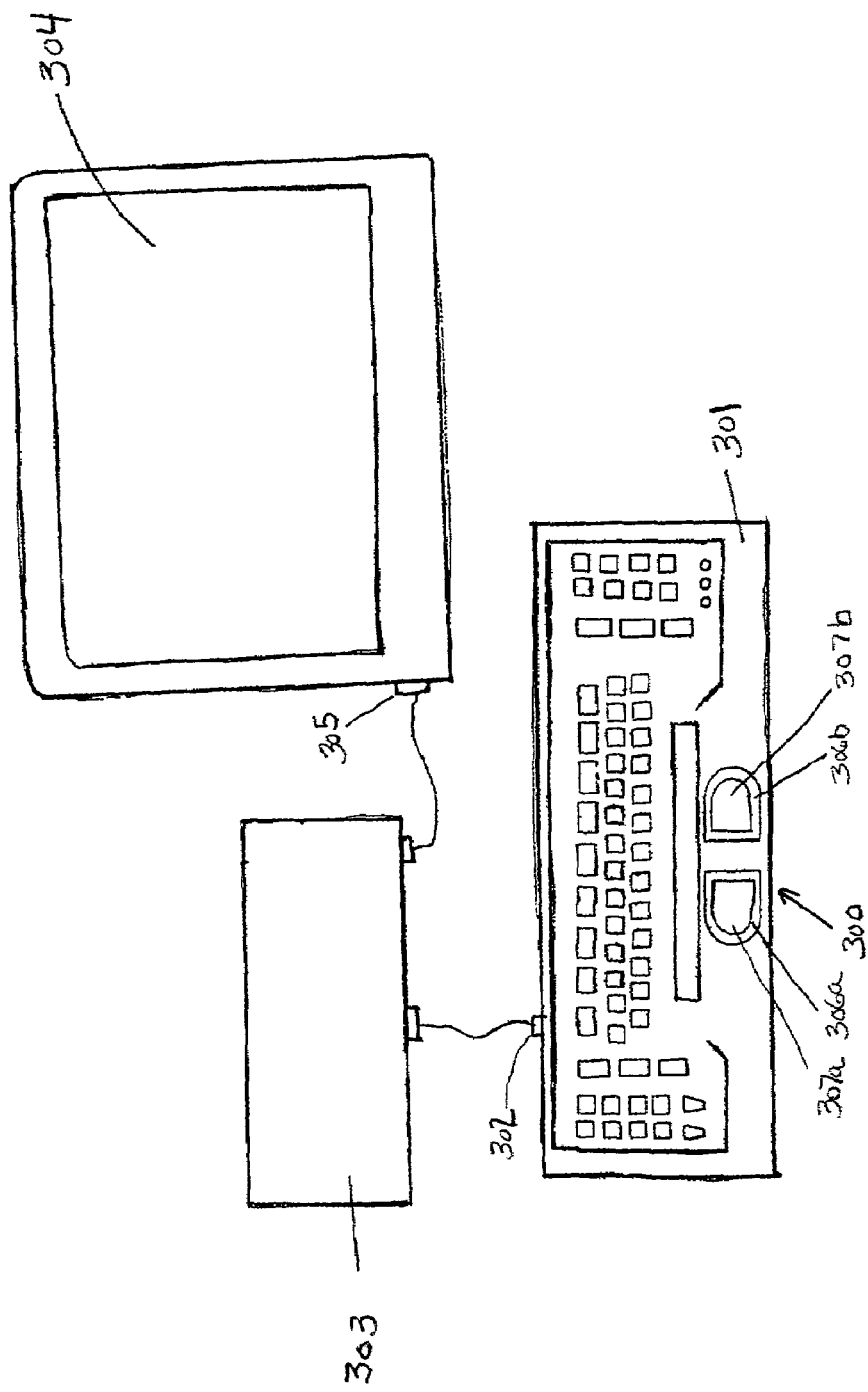
FIG. 20 is a computer keyboard unit of the instant invention connected to a central processing unit. The keyboard has a keyboard mouse system molded and/or manufactured into the computer keyboard unit. The mouse system of the external keyboard has left and right press touch buttons with touch screens, touch pads, glide points, or touch panels built, molded, or manufactured into the press buttons.

It is an object of this invention to provide a new and improved external computer keyboard with a mouse system 300 which can be used with personal computers, laptop or notebook computers, home computers, office computers, desktop computers, handspring computers, visor computers, pocket pc's, and any other type of computer which are capable of using or functioning with an external computer keyboard mouse system. The computer keyboard mouse system 300 of the instant invention is connected by way of at least one port 302 to the central processing unit 303. A computer monitor 304 is also connected by way of at least one port 305 to the central processing unit 303. The external computer keyboard mouse system 300 has at least one mouse system press button 306, as shown in FIG. 20, with a touch pad, glide point, touch panel, or touch screen 307, integrated, built, manufactured, or molded into the at least one mouse system press button 306. As an example, the computer keyboard mouse system 300 can have a left press button 306a and a right press button 306b. However, the invention is not limited to use of only one or two press buttons. The left press button 306a and the right press button 306b can each have a touch screen, touch panel, glide point, or touch pad 307a and 307b, respectively, built, manufactured, or molded into these press buttons. The advantage of this design, and the following disclosed method, being that only one hand, finger, or object is required to manipulate the external computer keyboard mouse system 300. The mouse system 300 can be built, molded, or manufactured into any area of the external computer keyboard 301. The new and improved design for the external computer keyboard mouse system 300 frees up keyboard space, and makes use of the mouse system easier and more convenient. As an example, a user of the new and improved external computer keyboard mouse system 300 design desiring to cut, copy, paste, move, delete, change the style or font of, print, change the spacing of, or perform any other operation on, a section of text displayed on a computer monitor 304, or any other type of monitoring device used in conjunction with the external computer keyboard mouse system 300, would first locate the arrow or screen selector to the desired position in the displayed text using the left touch pad, glide point, touch screen, or touch panel 307a on the left press button 306a and/or the right touch pad, touch screen, glide point, or touch panel 307b on the right press button 306b by lightly touching and moving a finger or other object over the surface of the left touch screen, touch pad, glide point, or touch panel 307a on the left press button 306a and/or the right touch panel, touch screen, glide point, or touch pad 307b on the right press button 306b After the screen selector or arrow has been positioned at the starting point in the text intended to be highlighted, the user then taps the left touch screen, touch pad, glide point, or touch panel 307a on the left press button 306a or the right touch screen, touch panel, glide point, or touch pad 307b on the right press button 306b to position the cursor at the starting point in the text to be highlighted. The user then presses and releases the left press button 306a and/or the right press button 306b, at least once, such that the press button returns to the original position after the pressure applied to press the press button is removed. This prompts the computer software and/or computer operating system that highlighting will be the next mode of operation. The user then uses the left touch pad, glide point, touch screen, or touch panel 307a on the left press button 306a and/or the right touch pad, glide point, touch panel, or touch screen 307b on the right press button 306b to highlight the desired text by touching and moving a finger, or other object, over the surface of the touch screen, touch pad, glide point, or touch panel 307a and/or 307b. After the desired text has been highlighted, the user depresses and releases the left press button 306a and/or the right press button 306b, again, such that the left press button 306a or right press button 306b returns to the original position after the pressure applied to press the press button is removed. This releases or disengages the computer software and/or computer operating system from the highlighting mode, but retains the highlighted text on the monitor. The user then uses the left touch screen, touch panel, glide point, or touch pad 307a on the left press button 306a and/or the right touch pad, glide point, touch screen, or touch panel 307b on the right press button 306b to manipulate the screen selector or arrow, by pointing to an icon or opening a window, for example, to select the desired operation intended to be performed on the highlighted text; such as to cut, copy, paste, move, delete, change the style or font, print, change the spacing, or perform any other operation. It is noted that the left touch screen, touch pad, glide point, or touch panel 307a located on the left press button 306a and the right touch screen, touch pad, glide point, or touch panel 307b located on the right press button 306b are not sensitive to lightly applied pressures so as to avoid easy depression of the press buttons 306a and 306b. This will avoid and function to prevent unintentional prompting of the highlighting mode. The left touch screen, touch pad, glide point, or touch panel 307a of the left press button 306a and the right touch screen, touch pad, glide point, or touch panel 307b of the right press button 306b, however, remain sensitive to light touch or tapping so as to manipulate the screen selector or arrow for highlighting, repositioning of the cursor, opening of windows, or for selection of other functions.

An alternative to the left touch screen, touch pad, glide point, or touch panel 307a being built, manufactured, or molded into the left press button 306a and/or the right touch pad, glide point, touch screen, or touch panel 307b being built, molded, or manufactured into the right press button 306b for the external computer keyboard mouse system 300, as shown in FIG. 20, is that shown in FIG. 3 wherein the touch screen, touch pad, glide point, or touch panel 111 can be located in between the left press button 110a and the right press button 110b, on the left side of the left press button 110a and right press button 110b, on the right side of the left press button 110a and right press button 110b, on the front side of the left press button 110a and right press button 110b, on the bottom side of the left press button 110a and right press button 110b. The same method of operation, as previously presented, for manipulating the left press button 110a and the right press button 110b and their corresponding touch pad, glide point, touch screen, or touch panel 111 applies in these alternative designs.

Figure 21:
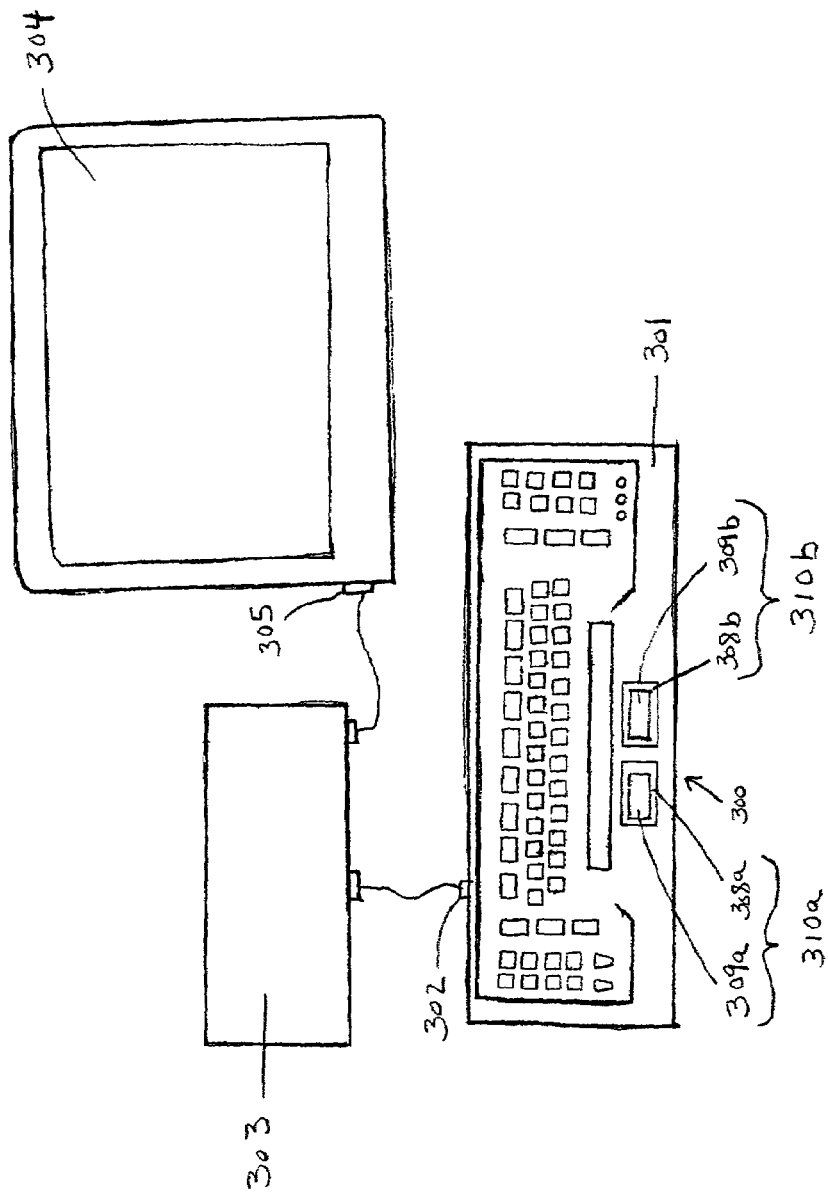
FIG. 21 is a computer keyboard unit of the instant invention connected to a central processing unit and monitor. The keyboard has a keyboard mouse system molded and/or manufactured into the computer keyboard unit. The mouse system of the external keyboard has left and right sliding panel touch buttons with touch screens, touch pads, glide points, or touch panels built into the sliding panels or sliding buttons.

As a further alternative, the external computer keyboard mouse system 300 of the instant invention can be equipped with at least one sliding panel or sliding button, as shown in FIG. 21. A further alternative for the external computer keyboard mouse system is to use at least one sliding panel or sliding button 308 having a touch screen, touch panel, glide point, or touch pad 309 integrated, built, molded, or manufactured into and on the sliding panel or sliding button 308, as shown in FIG. 21. An advantage to providing a touch panel, touch screen, glide point, or touch pad 309 integrated, built, molded, or manufactured into a sliding panel or sliding button is that only one hand, finger, or other object is needed by the user to manipulate the external computer keyboard mouse system 300. As an example, a user of this new and improved design desiring to cut, copy, paste, move, delete, change the style or font of, print, change the spacing of, or perform any other operation on, a desired section of text displayed on a computer monitor 304, or any other type of monitoring device used in conjunction with the external or auxiliary computer keyboard mouse system 300, would first locate the arrow or screen selector to the desired position in the displayed text using the left touch panel, touch screen, glide point, or touch pad 309a of the left sliding panel touch button 310a and/or the right touch panel, touch screen, glide point, or touch pad 309b of the right sliding panel touch button 310b by lightly touching and moving a finger or other object over the surface of the left touch screen, touch panel, glide point, or touch pad 309a of the left sliding panel touch button 310a and/or the right touch pad, glide point, touch panel, or touch screen 309b of the right sliding panel touch button 310b. After the screen selector or arrow has been positioned at the starting point of the text intended to be highlighted, the user then taps the left touch screen, glide point, touch pad, or touch panel 309a of the left sliding panel touch button 310a, and/or the right touch panel, touch pad, glide point, or touch pad 309b of the right sliding panel touch button 310b to position the cursor at the starting point of the text intended to be highlighted. Next, the user slides the left sliding panel touch button 310a or the right sliding panel touch button 310b, using a finger or other desired object, such that the sliding panel touch button is displaced forward, backward, sideways, or diagonal from an original position to a position which prompts the computer software and/or computer operating system that highlighting will be the next mode of operation. The user then uses the left touch pad, glide point, touch panel, or touch screen 309a of the left sliding panel touch button 310a and/or the right touch pad, glide point, touch screen, or touch panel 309b of the right sliding panel touch button 310b to highlight the desired text by lightly brushing, touching, or rubbing a finger or other object over the surface of the left touch button, touch pad, glide point, or touch panel 309a of the left sliding panel touch button 310a, and/or the right touch panel, touch pad, glide point, or touch screen 309b of the right sliding panel touch button 310b. After the desired text has been highlighted, the user then slides the left sliding panel touch button 310a, or the right sliding panel touch button 310b back to the original position which releases or disengages the computer software and/or computer operating system from the highlighting mode. The user then uses the left touch pad, glide point, touch panel, or touch screen 309a of the left sliding panel touch button 310a and/or the right touch pad, touch screen, glide point, or touch panel 309b of the right sliding panel touch button 310b to manipulate the screen selector or arrow to select, by pointing to an icon or opening a window, for example, the desired operation, to be performed on the highlighted text, such as cutting, copying, pasting, moving, deleting, changing the style or font, printing, changing the spacing, or performing any other operation.

As an alternative to the left touch screen, glide point, touch pad, or touch panel 309a being built, molded, or manufactured into the left sliding panel button 308a and/or the right touch pad, touch screen, touch panel, or glide point, 309b being built, molded, or manufactured into the right sliding panel button 308b for the external computer keyboard mouse system 300, the touch screen, glide point, touch pad, or touch panel 111, as shown in FIG. 3, can be located in between the left sliding panel button 110a and the right sliding panel button 110b, on the left side of the left sliding panel button 110a and the right sliding panel button 110b, or on the right side of the left sliding panel button 110a and the right sliding panel button 110b, adjacent and on the front side of the left sliding panel button 110a and the right sliding panel button 110b, or adjacent and below the left sliding panel button 110a and the right sliding panel button 110b. The same method of operation, as previously recited, for manipulating the left sliding panel button 110a and/or the right sliding panel button 110b and the touch pad, glide point, touch screen, or touch panel 111, applies in all these alternative designs.

Figure 22:
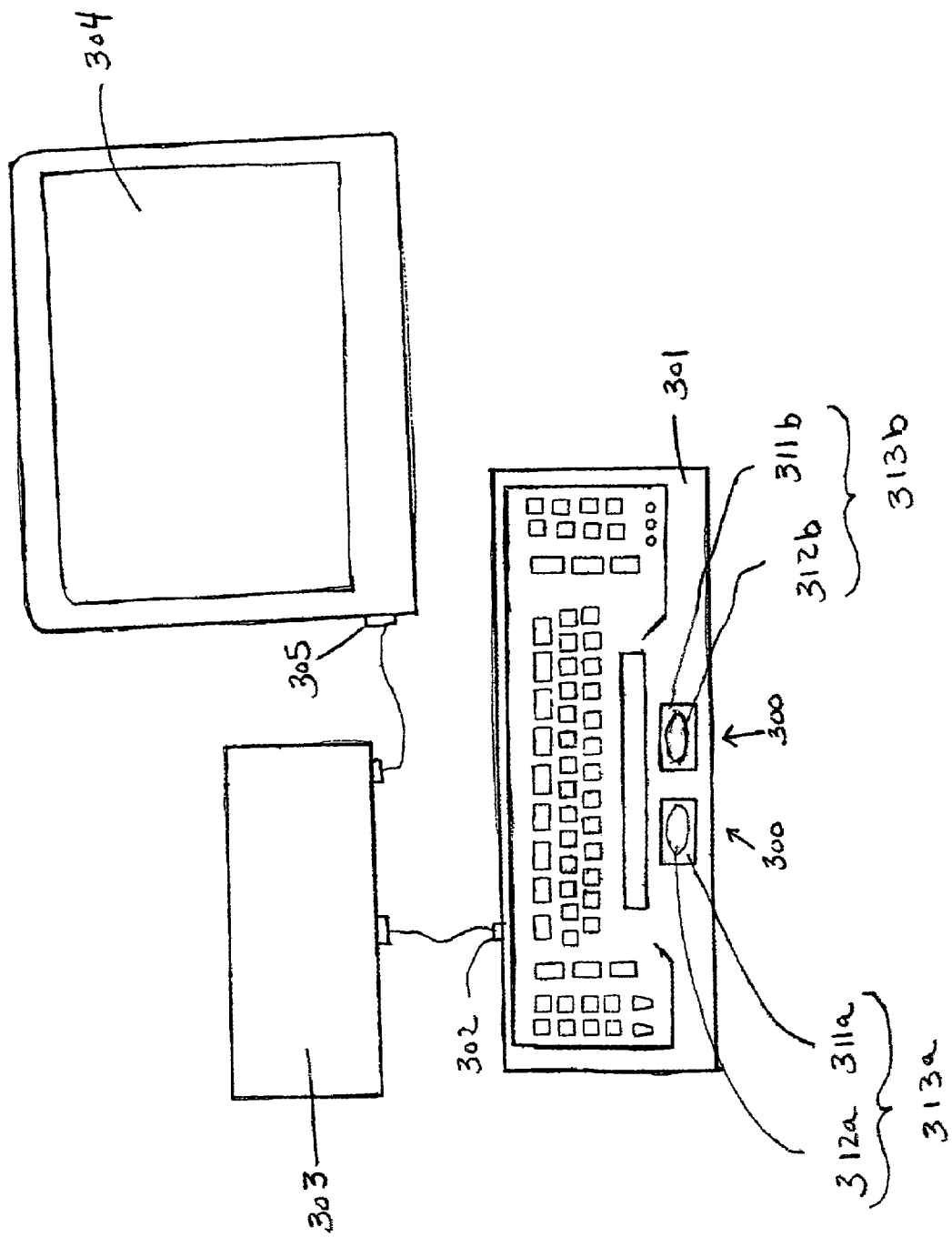
FIG. 22 is a computer keyboard unit of the instant invention connected to a central processing unit and monitor. The keyboard has a keyboard mouse system molded and/or manufactured into the computer keyboard unit. The mouse system of the external keyboard has left and right press and lock touch buttons with touch screens, touch pads, glide points, or touch panels built, molded, or manufactured into the press and lock buttons.

As a further alternative, the external computer keyboard mouse system 300 of the instant invention can be equipped with at least one press and lock touch button 313, as shown in FIG. 22. A further alternative for the external computer keyboard mouse system is to use at least one press and lock touch button 313 having a touch screen, touch panel, glide point, or touch pad 312 integrated, built, molded, or manufactured into and on the press and lock button 311, as shown in FIG. 22. An advantage to providing a touch panel, touch screen, glide point, or touch pad 312 integrated, built, molded, or manufactured into a press and lock button 311 is that only one hand, finger, or other object is needed by the user to manipulate the external computer keyboard mouse system 300. As an example, a user of this new and improved design desiring to cut, copy, paste, move, delete, change the style or font of, print, change the spacing of, or perform any other operation on, a desired section of text displayed on a computer monitor 304, or any other type of monitoring device used in conjunction with the external or auxiliary computer keyboard mouse system 300, would first locate the arrow or screen selector to the desired position in the displayed text using the left touch panel, touch screen, glide point, or touch pad 312a of the left press and lock button 311a and/or the right touch panel, touch screen, glide point, or touch pad 312b of the right press and lock button 311b by lightly touching and moving a finger or other object over the surface of the left touch screen, touch panel, glide point, or touch pad 312a of the left press and lock touch button 313a and/or the right touch pad, glide point, touch panel, or touch screen 312b of the right press and lock touch button 313b. After the screen selector or arrow has been positioned at the starting point of the text intended to be highlighted, the user then taps the left touch screen, glide point, touch pad, or touch panel 312a of the left press and lock touch button 313a, and/or the right touch panel, touch pad, glide point, or touch pad 312b of the right press and lock touch button 313b to position the cursor at the starting point of the text intended to be highlighted. Next, the user presses the left press and lock touch button 313a or the right press and lock touch button 313b, using a finger or other desired object, such that the press and lock touch button is displaced from an original position to a position to a depressed and locked position which prompts the computer software and/or computer operating system that highlighting will be the next mode of operation. The user then uses the left touch pad, glide point, touch panel, or touch screen 312a of the left press and lock touch button 313a and/or the right touch pad, glide point, touch screen, or touch panel 312b of the right press and lock touch button 313b to highlight the desired text by lightly brushing, touching, or rubbing a finger or other object over the surface of the left touch button, touch pad, glide point, or touch panel 312a of the left press and lock touch button 313a, and/or the right touch panel, touch pad, glide point, or touch screen 312b of the right press and lock touch button 313b. After the desired text has been highlighted, the user then presses the left press and lock touch button 313a, or the right press and lock touch button 313b, back to the original position which releases or disengages the computer software and/or computer operating system from the highlighting mode. The user then uses the left touch pad, glide point, touch panel, or touch screen 312a of the left press and lock touch button 313a and/or the right touch pad, touch screen, glide point, or touch panel 312b of the right press and lock touch button 313b to manipulate the screen selector or arrow to select, by pointing to an icon or opening a window, for example, the desired operation to be performed on the highlighted text, such as cutting, copying, pasting, moving, deleting, changing the style or font, printing, changing the spacing, or performing any other operation As an alternative to the left touch screen, glide point, touch pad, or touch panel 312a being built, molded, or manufactured into the left press and lock button 311a and/or the right touch pad, touch screen, touch panel, or glide point, 312b being built, molded, or manufactured into the right press and lock button 311b for the external computer keyboard mouse system 300, is to locate the touch screen, glide point, touch pad, or touch panel 111, as shown in FIG. 3, in between the left press and lock button 110a and the right press and lock button 110b, on the left side of the left press and lock button 110a and the right press and lock button 110b, or on the right side of the left press and lock button 110a and the right press and lock button 110b, adjacent and on the front side of the left press and lock button 110a and the right press and lock button 110b, or adjacent and below the left press and lock button 110a and the right press and lock button 110b. The same method of operation, as previously recited, for manipulating the left press and lock button 110a and/or the right press and lock button 110b and the touch pad, glide point, touch screen, or touch panel 111, applies in all these alternative designs.

In addition, a backlit area can be incorporated into the press and lock button, or such that an area is illuminated when the press and lock button is depressed and locked, to indicate that the highlighting mode has been activated. The backlit area is darkened when the depressed press and lock button is pressed again to return it to its original position.

Figure 23:
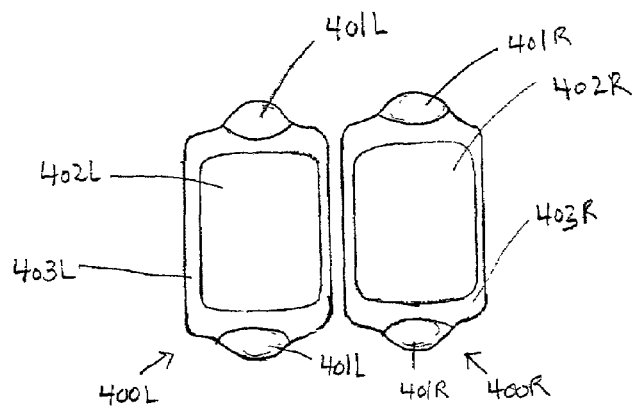
FIG. 23 is a press button, press and lock button, or sliding panel button having a touch screen, touch pad, touch panel, or glide point built, molded, or manufactured into the button. There are also finger pressing devices built, molded, or manufactured into the outer lip or peripheral portion of the button.

An added design feature for the press touch buttons, press and lock touch buttons, and the sliding panel touch buttons, all of which are schematically represented by 400L and 400R of FIG. 23 of the instant invention, includes providing finger pressing devices 401L 401R which are molded, manufactured, or formed on the press touch buttons, press and lock touch buttons, and sliding panel touch buttons, 400L and 400R as depicted in FIG. 23. The finger pressing devices 401L and 401R provide the user of the new and improved mouse system with an area or location on the press touch button, press and lock touch button, or sliding panel touch button 400L and 400R for applying pressure for pressing of the press touch buttons and press and lock touch buttons, and for the sliding of the sliding panel touch buttons 400L and 400R. There is no restriction for the location of the finger pressing devices 401L and 401R on the press touch buttons, press and lock touch buttons, and sliding panel touch buttons 400L and 400R. The finger pressing devices 401L and 401R may also be located on press buttons, press and lock buttons, and sliding panel buttons 403L and 403R which are without touch screens, touch pads, glide points, or touch panels 402L and 402R built, molded, or manufactured in the press button, press and lock button, or sliding panel button 403L and 403R. The finger pressing devices 401L and 401R can have a hollowed portion, for example, which generally fits the shape of a finger tip. However, the finger pressing devices 401L and 401R can take on any desired shape or design.

I claim:

1. A handheld computer mouse system comprising at least one mechanical mouse button and having at least one touch pad, wherein said at least one touch pad is integrated into a cavity opening formed in said at least one mechanical mouse button, said handheld computer mouse system further comprising a handheld mouse system housing for supporting said at least one mechanical mouse button, said mechanical mouse button being movably mounted within said mouse system housing and capable of independent movement relative to said mouse system housing to invoke a highlighting mode without physical movement of said mouse system housing.

2. The handheld computer mouse system of claim 1, wherein said at least one mechanical mouse button is a press button.

3. The handheld computer mouse system of claim 1, wherein said at least one mechanical mouse button is a press and lock button.

4. The handheld computer mouse system of claim 1, wherein said at least one mechanical mouse button is a sliding panel button.

5. The handheld computer mouse system of claim 1, wherein said mechanical mouse button has at least one finger pressing device formed thereon for application of pressure for causing movement of said at least one mechanical mouse button relative to said mouse system housing.

6. An auxiliary computer mouse, wherein said auxiliary computer mouse comprises a computer mouse housing supporting at least one mechanical mouse button, and at least one touch pad integrated into a cavity opening formed in said at least one mechanical mouse button, said mechanical mouse button being movably mounted within said mouse housing and capable of independent movement relative to said mouse housing to invoke a highlighting mode without physical movement of said mouse housing.

7. The auxiliary computer mouse of claim 6, wherein said at least one mechanical mouse button is a press button.

8. The auxiliary computer mouse of claim 6, wherein said at least one mechanical mouse button is a press and lock button.

9. The auxiliary computer mouse of claim 6, wherein said at least one mechanical mouse button is a sliding panel button.

10. The auxiliary computer mouse of claim 6, wherein said at least one mechanical mouse button having said at least one touch pad is integrated into a cavity opening formed in a sidewall of said auxiliary computer mouse housing.

11. The auxiliary computer mouse of claim 6, wherein said computer mouse housing is separate from a central processing unit housing and separate from a keyboard housing.

12. The handheld computer mouse system of claim 4, wherein said sliding panel button is capable of being displaced forward, backward, sideways, or diagonally from an initial position.

13. The handheld computer mouse system of claim 3, wherein said press and lock button is provided with a means for allowing said press and lock button to pivot.

14. The auxiliary computer mouse of claim 6, wherein said computer mouse housing is an auxiliary computer keyboard housing.

15. The handheld computer mouse system of claim 1, wherein said handheld computer mouse system manipulates and relocates a screen cursor without physical movement or repositioning of said handheld mouse system housing.

16. The handheld computer mouse system of claim 1, wherein at least one wall forming said cavity opening in said mechanical mouse button remains in a face-to-face relationship with at least one wall of the touch pad during manipulation of said at least one mechanical mouse button.

17. The auxiliary computer mouse of claim 6, wherein said computer mouse functions to point and reposition a screen cursor without physical movement of said mouse housing.

18. The handheld computer mouse system of claim 1, wherein said computer mouse system functions to point and reposition a screen cursor without physical movement of said mechanical mouse button.

19. The handheld computer mouse system of claim 1, wherein said at least one mechanical mouse button and said at least one touch pad are adapted to move together in a desired direction relative to said computer mouse system housing.

20. The handheld computer mouse system of claim 1, wherein said mechanical mouse button with said touch pad comprises a backlit area that is illuminated during said highlighting mode.

21. The auxiliary computer mouse of claim 6, wherein said at least one mechanical mouse button is integrated into a cavity opening formed in a top wall of said auxiliary computer mouse housing.

22. The auxiliary computer mouse of claim 6, wherein said computer mouse housing is a keyboard housing and is separate from a central processing unit housing.

23. The handheld computer mouse system of claim 1, wherein at least one wall forming said cavity opening in said mechanical mouse button is in a face-to-face relationship with at least one wall of the touch pad.

24. The handheld computer mouse system of claim 1, wherein at least one wall of said at least one touch pad extends into said cavity opening.

* * * * *

UNITED STATES PATENT AND TRADEMARK OFFICE
CERTIFICATE OF CORRECTION

PATENT NO. : 6,970,159 B2  Page 1 of 1
DATED : November 29, 2005
INVENTOR(S) : Robin S. Gray It is certified that error appears in the above-identified patent and that said Letters Patent is hereby corrected as shown below:

<u>Title page, Item [54] and Column 1, lines 1-2,</u>
Title, "MOUSE PRINTING DEVICE WITH INTEGRATED TOUCH PAD BUTTONS" should read -- MOUSE POINTING DEVICE WITH INTEGRATED TOUCH PAD BUTTONS --.

<u>Column 10,</u>
Line 38, "void 120 in the walls 109 of a portable computer The touch" should read -- void 120 in the walls 109 of a portable computer. The touch --.

<u>Column 14,</u>
Line 18, "arrow or screen selector displayed on the monitor 204 That" should read -- arrow or screen selector displayed on the monitor 204. That --.

Signed and Sealed this

Twenty-fifth Day of April, 2006

JON W. DUDAS
*Director of the United States Patent and Trademark Office*